United States Patent [19]

Cail et al.

[11] 4,332,461

[45] Jun. 1, 1982

[54] ELECTRICAL DRIVE FOR SCANNING OPTICS IN A CONTINUOUSLY VARIABLE REDUCTION COPIER

[75] Inventors: Norman Cail, Longmont; Raymond A. Daniels, Boulder; John B. Eggerling, Lyons; Gerald B. Lammers, Boulder, all of Colo.

[73] Assignee: IBM Corporation, Armonk, N.Y.

[21] Appl. No.: 100,775

[22] Filed: Dec. 6, 1979

[51] Int. Cl.³ .............................................. G03G 15/00
[52] U.S. Cl. ..................................... 355/14 R; 355/8; 355/55
[58] Field of Search ................... 355/8, 14 R, 55, 3 R, 355/57, 11, 60; 364/110, 118; 318/329

[56] References Cited

U.S. PATENT DOCUMENTS

| | | | |
|---|---|---|---|
| 3,614,222 | 10/1971 | Post et al. | 355/8 X |
| 3,820,893 | 6/1974 | Donohue et al. | 355/14 R |
| 3,917,396 | 11/1975 | Donohue et al. | 355/14 R |
| 3,917,400 | 11/1975 | Rodek et al. | 355/50 |
| 4,084,897 | 4/1978 | Queener | 355/8 |
| 4,118,118 | 10/1978 | Barto | 355/8 |
| 4,120,578 | 10/1978 | Daniels et al. | 355/8 |
| 4,148,578 | 4/1979 | Bujese | 355/8 |
| 4,215,931 | 8/1980 | Tsuda et al. | 355/14 R |
| 4,218,735 | 8/1980 | McCutcheon | 355/14 R X |

FOREIGN PATENT DOCUMENTS 2008494 6/1979 United Kingdom ..................... 355/8

Primary Examiner—Richard L. Moses
Attorney, Agent, or Firm—Pollock, Vande Sande & Priddy

[57] ABSTRACT

A scanning continuously variable reduction electrophotographic copier includes a servo motor for driving the document scanning carriages. Servo motor, and therefore carriage motion parameters of velocity, duration of acceleration and deceleration, length or time duration of travel and time of start of scan are selectable to produce a selected reduction ratio within a continuous range of reduction ratios. In one embodiment, three partially overlapping hybrid servo loops are used, one for acceleration and deceleration, another for constant velocity motion and a third for precise stopping control. In another embodiment, a single loop controls the entire motion.

26 Claims, 17 Drawing Figures

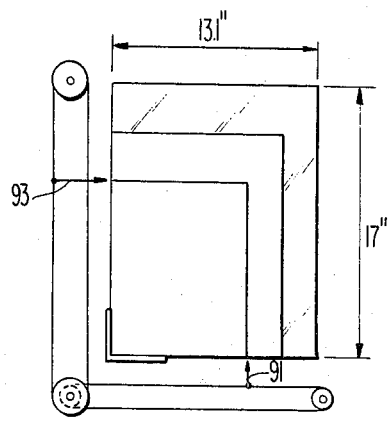
FIG 4
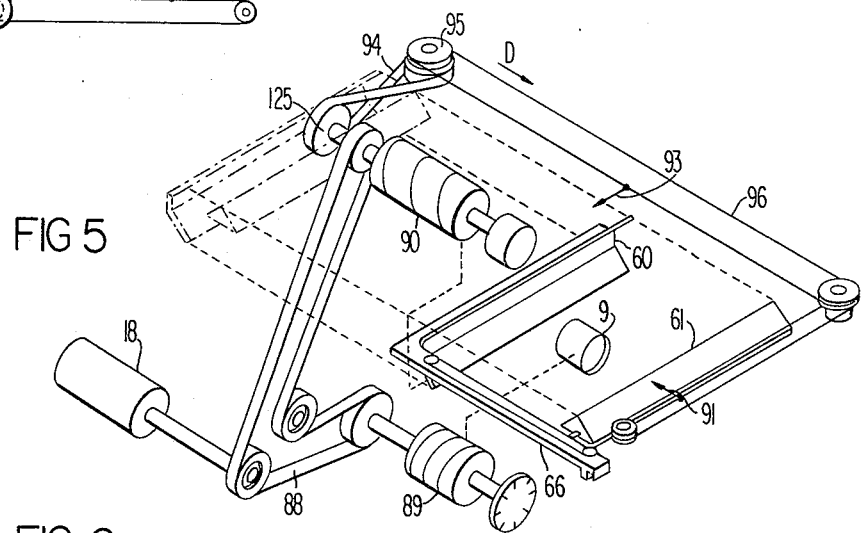
FIG 5
FIG 6
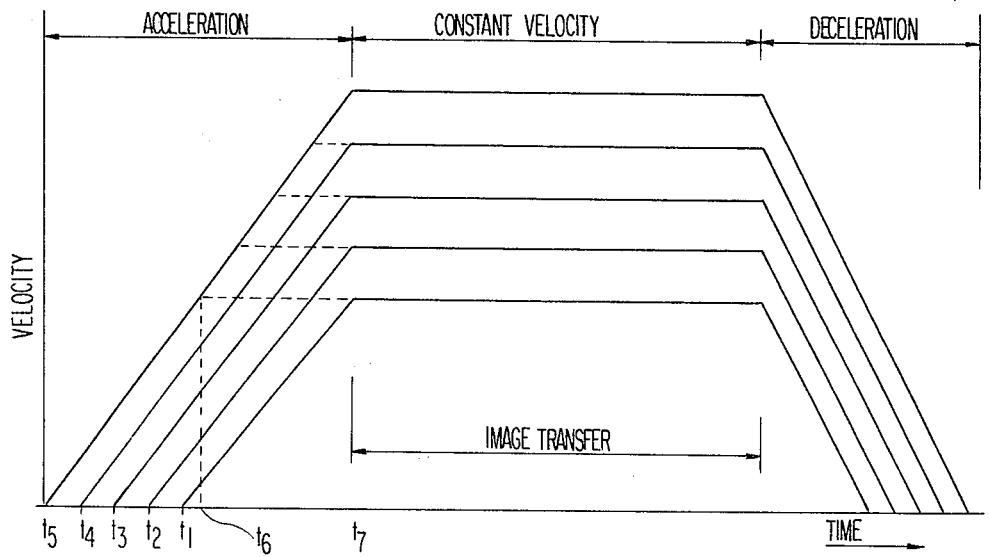

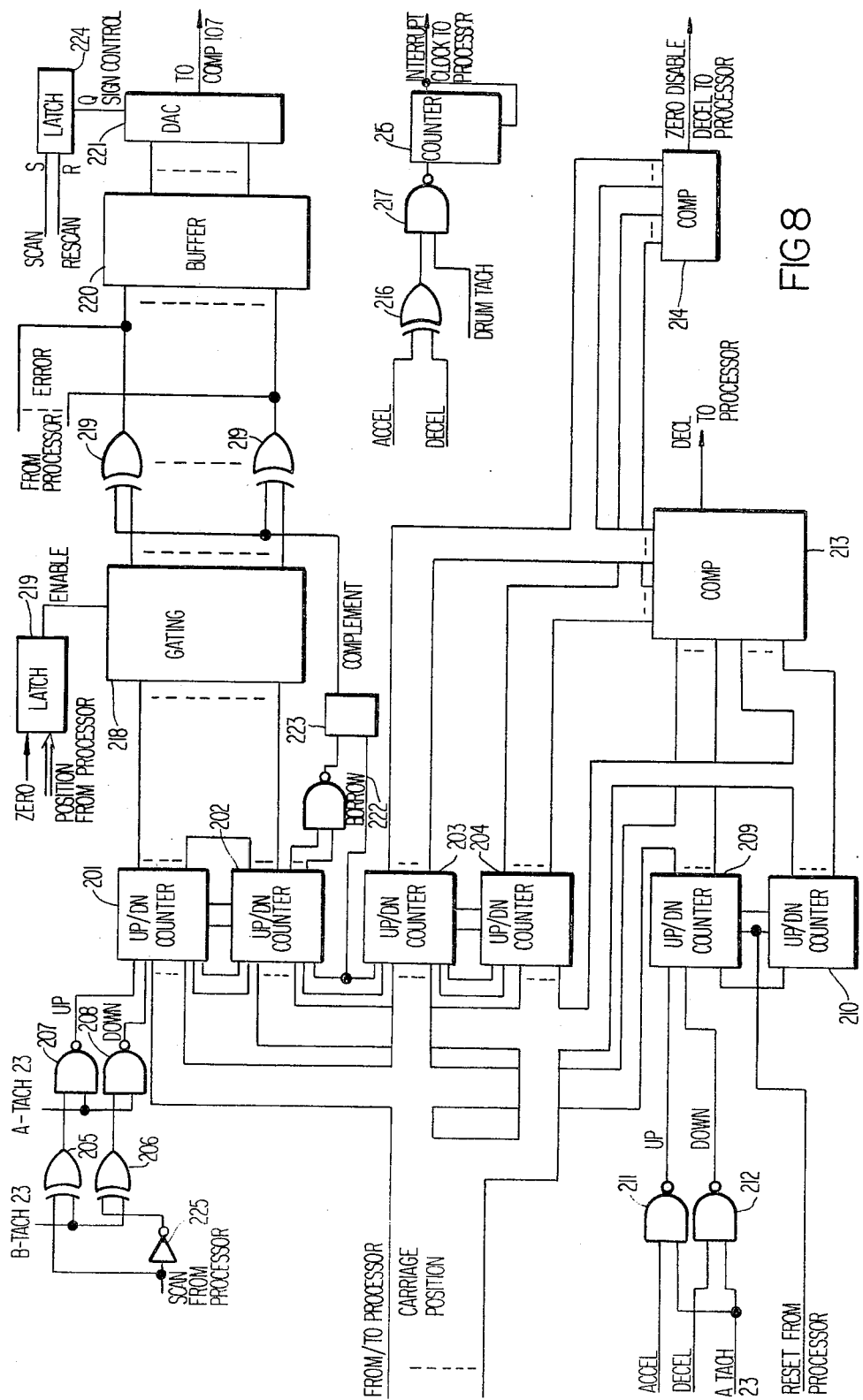

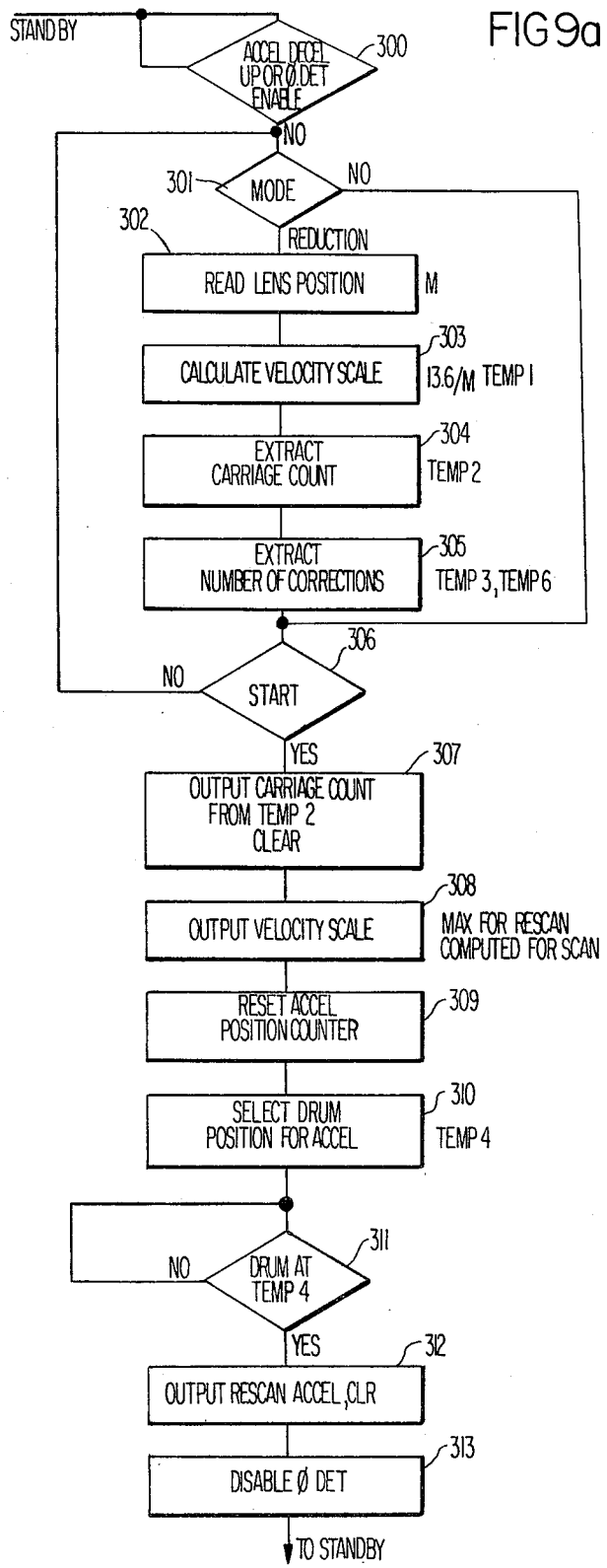

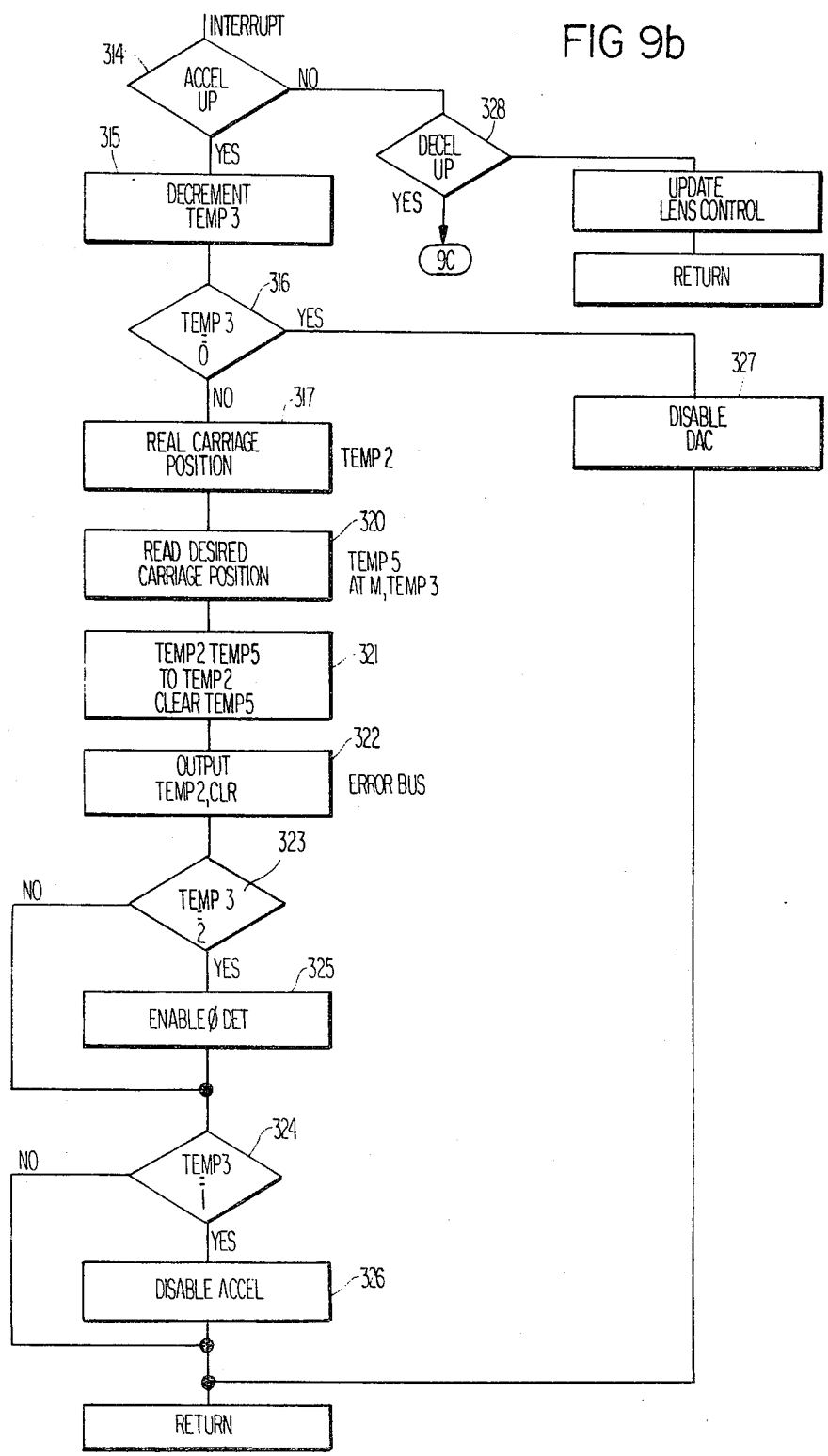

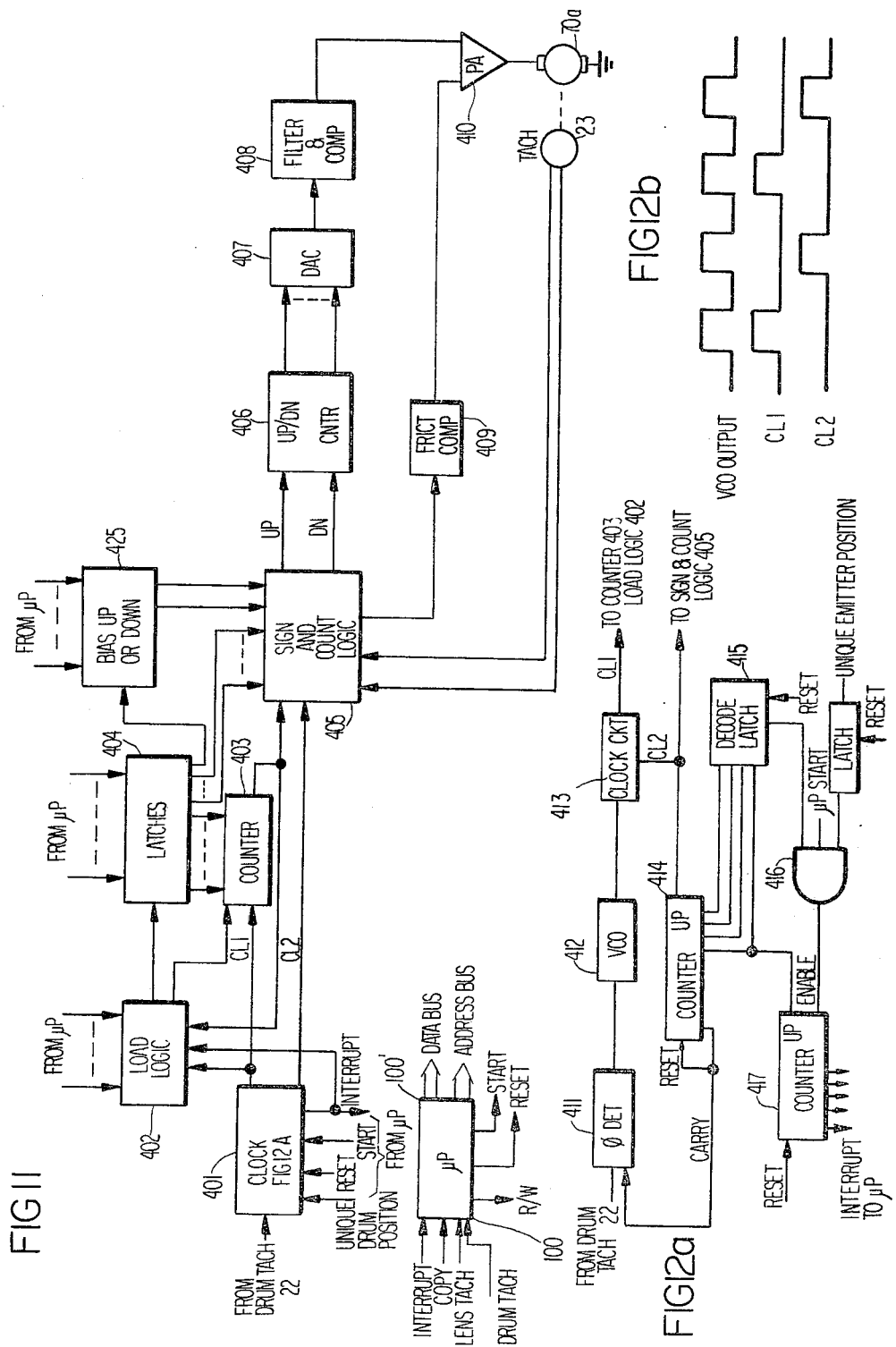

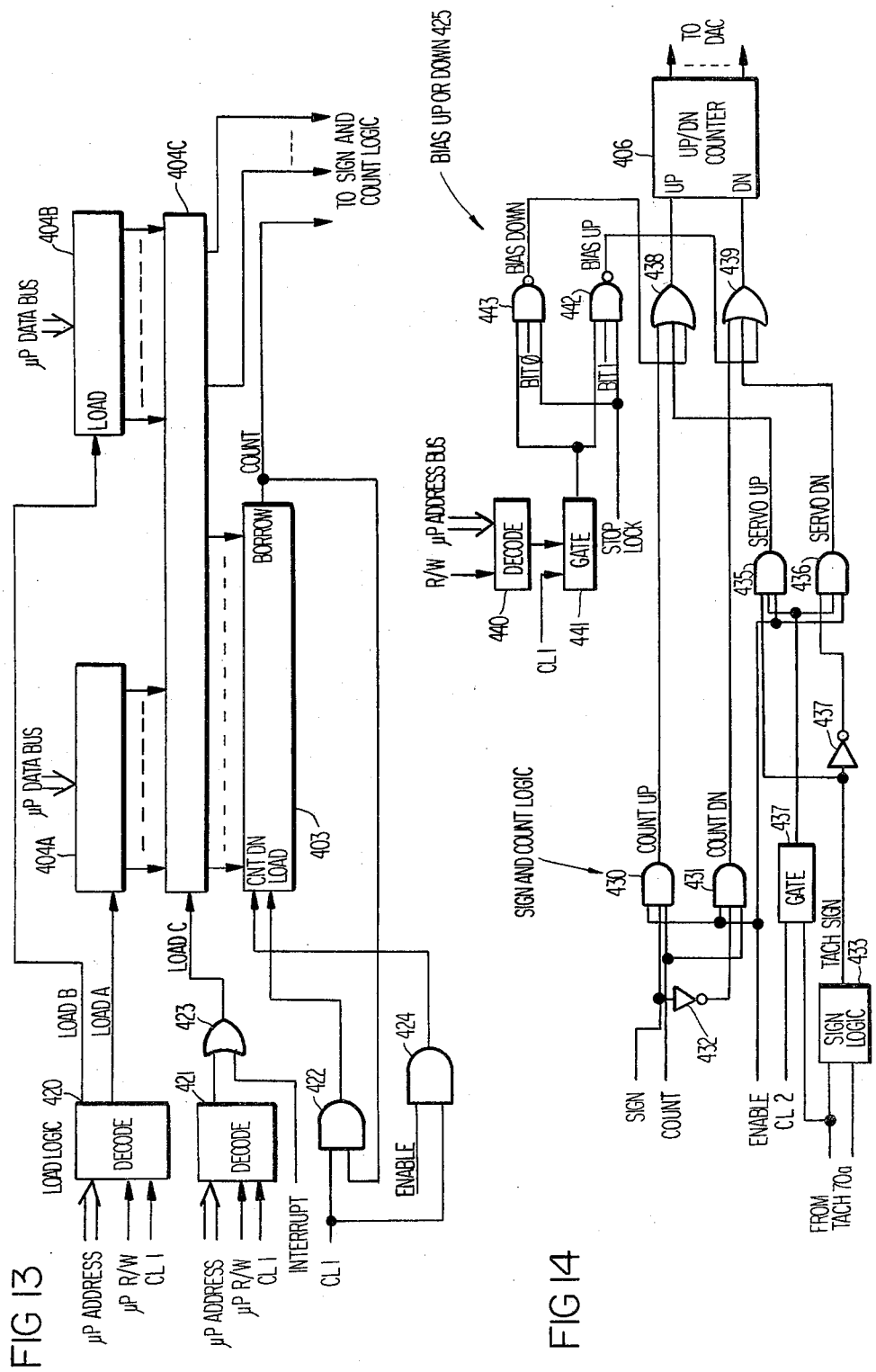

ELECTRICAL DRIVE FOR SCANNING OPTICS IN A CONTINUOUSLY VARIABLE REDUCTION COPIER

FIELD OF THE INVENTION

The present invention relates to an electrical drive system for the scanning carriage in a continuously variable reduction electrostatic copier.

RELATED APPLICATIONS

The present invention provides an electrical drive for the scanning carriage in a copier which, in other respects, is disclosed in application Ser. No. 904,706 filed May 10, 1978 which is a continuation of now-abandoned Ser. No. 721,125 filed on Sept. 7, 1976, commonly assigned, the disclosure of which is incorporated by reference.

BACKGROUND OF THE INVENTION

In most known electrophotographic copy machines, an image of the object being copied is directed to an image carrier. The image can be of the entire document (a flash exposure system) or of only a portion of the document (a scanning system). In the latter case, an image of the document is built up in time as the object being copied is scanned.

Scanning systems have been embodied in plain and coated paper copiers. In the former type, the image is electrically recorded on an intermediate carrier from whence it is transferred to the copy paper. In the latter type, the image is directly laid down on the coated paper. Accordingly, the term image carrier will be applied to either the intermediate carrier (for plain paper copiers) or the copy paper (for coated paper copiers).

Various document copier machines have been produced with the capability of reducing the size of copies made from an original, usually placed on a transparent document support. Most of these machines, however, have been designed for providing specific discrete reduction ratios, e.g., 0.75:1 or 0.6:1. Rarely has an attempt been made to provide a document copier with the capability of continuously variable reduction from ratios such as 1:1 to another ratio such as, for example, 0.647:1. The few attempts that do appear in the prior art, for example, U.S. Pat. Nos. 2,927,503 (Zollinger) and 3,395,610 (Evans) have operated with a flash exposure system. Flash exposure systems have the disadvantage of requiring a flat imaging surface which thus cannot use the rotating image carrier, or drum, found in the most popular commercially available copying machines. The requirement of a flat image plane also requires a mechanically more complex machine which occupies more space than does a machine which employs the rotating drum. Other disadvantages of the flash system are a higher power requirement and a machine which can temporarily blind an operator if the flash is eye-observed. Despite these disadvantages, most prior variable reduction systems opt for the flash exposure procedure to take advantage of the simplicity of its concept. For example, one of the complexities of the scanning system in a reduction copy machine is a requirement that the velocity of the scanning carriage relative to the surface velocity of the image carrier be changed as the reduction ratio is changed. However, systems capable of this function exist in the prior art, for example, U.S. Pat. Nos. 3,614,222; 3,897,148; and 3,542,467, but these systems are limited to two, three and five discrete reduction ratios, respectively, and therefore, only require two, three or five velocity ratios.

Since the carriage cannot be accelerated instantaneously, each carriage movement may include six phases. A scan movement is accomplished from a start of scan position to a home position encompassing acceleration, constant velocity and deceleration phases. Image transfer is accomplished during the constant velocity phase. This phase is only nominally at constant velocity since the objective is to maintain constant the relationship between carriage velocity and image carrier velocity. The carriage must also be moved from the home position to the start of scan position (termed rescan) which movement may also encompass three similar phases of motion.

In addition to selecting scan velocity, of the "constant" velocity phase of movement, in a manner correlated with a selected reduction ratio, the length of the scan must also be selected. For example, at 1:1, an 11 inch document is scanned into an 11 inch image, but at 0.647 reduction, a 17 inch document is scanned into the same 11 inch area. Thus, not only must the scan velocity be appropriately selected, but also the length of the scan. Of course, of primary concern is the length of the "constant" velocity phase. However, different velocities require different travel lengths for acceleration and deceleration as well.

In addition to selection of scan velocity and length, the relative position of the leading edge must also be located. Desirably, the leading edge of the copy paper must be matched to the leading edge of the image area. Therefore, if both the document and the copy paper are $8\frac{1}{2} \times 11$, it is necessary to place the leading edge of the image at the leading edge of the image area in order to transfer the entire image to the copy paper. If a document of 17 inch size is placed on a document support, it must still be squeezed into an 11 inch image area for transfer to an $8\frac{1}{2} \times 11$ inch sheet of copy paper. Therefore, unless over reduction is practiced, the leading edge of the image of the reduced document must also fall on the leading edge of the image area. Furthermore, in a scanning system, the carriage must scan the document at a velocity selected in dependence on the desired reduction. The different velocities require different acceleration times (and distances) and thus, the position of the carriage at the beginning of its movement and the time the movement commences relative to the image area on the drum must also be properly selected. Accordingly, the scanning carriage position at the beginning of movement must be selected in terms of time or space (or both) so that the carriage begins to scan the document at the same position relative to the image carrier surface, regardless of reduction.

The referred to patent application discloses a scanning, continuously variable reduction photocopier which meets the heretofore stated objectives of altering scan velocity, scan length and starting document scan location. In the referred to patent application, however, the scanning carriage drive system is mechanically coupled to the main drive motor and various cams, lead screws and drive bands are selectively positioned, rotated or adjusted so as to produce the desired motion. However, we believed it desirable to provide a system meeting these objects in which the scanning carriage drive was electrically controlled, rather than being mechanically coupled to the main drive motor. By providing an electrical control for the scanning carriage drive a number of advantages are derived. For one thing, the main drive motor can be reduced in size and the previously noted mechanical linkages can be eliminated, thus significantly reducing the total required machine drive torque, total machine volume and significantly reducing mechanical part count. In one embodiment, this torque reduction was over 30%, machine volume decreased by 500 in$^3$ and the mechanical drive part count was reduced from over 300 to about 60.

Since the carriage drive is no longer mechanically coupled to the main drum motor, flexibility is provided in selecting the relative timing of various machine cycles and this allows a reduction in the "time to first copy" which is an important characteristic of copying machines.

In addition, decoupling carriage drive and main motor drive enables carriage motion to adapt for different paper lengths maintaining a common image reference to both simplify gating paper feed and eliminating detack marks from within the image area since the paper detack is common for all lengths of paper. Furthermore, mechanical couplings to the optical elements (lens and carriage positioning) can be eliminated significantly simplifying the optical controls. The overall simplification of the machine, reduction in number of components and machine volume, and decrease in power requirements will lead to a significant reduction in required maintenance.

SUMMARY OF THE INVENTION

Briefly stated, the invention comprises a continuously variable reducing imaging system for an electrophotograph copy machine which employs scanning optics for directing the image to the image carrier and in which the scanning optics are electrically, not mechanically, coupled to the main drive motor. More particularly, the scanning carriage drive is servo controlled. To meet the requirements of providing continuously variable reduction ratios, scanning velocity is uniquely selected among a continuous range of velocities so as to provide the proper relation between image carrier velocity and scanning velocity. To maintain the desired relationship between scanning carriage velocity and image carrier velocity, in view of the lack of any mechanical coupling between them, a servo loop is employed to "phase lock" the scanning drive motor to the motion of the image carrier. Unique scanning velocities, each related to a different reduction ratio, are achieved by accelerating the servo motor. Accordingly, the acceleration time to achieve different velocities is also different. As a consequence, since the various documents to be copied have a common reference edge, the scanning carriage may begin its acceleration at a unique position corresponding to each of the different unique velocities which are to be achieved.

Mechanically decoupling the scanning carriage drive from the main drive motor allows the scanning carriage drive to be energized independent of image carrier motion. This is advantageous particularly in systems which employ a drum as the image carrier. More particularly, the scanning carriage is no longer limited to beginning motion at a selected position in the rotation of the drum. This allows the image from various sized documents to be laid down on the drum with a common leading edge which is advantageous in that it eliminates detack marks on copy paper produced by the detack of previously made smaller-sized copies.

In one embodiment, the copier includes a stationary document glass and a rotating photoconductive drum. The scanning carriage is driven by a servo motor which, at various times, is controlled by one of a plurality of feedback loops. The feedback loops can be conditioned in accordance with a desired reduction mode in a continuous range of reduction modes. Operator controls adjusted to select a particular reduction mode are reflected within the machine by positioning a lens at a unique position along a predetermined path, the position corresponding to the desired reduction mode. The scanning carriage assembly includes, as is shown in the referenced application, a pair of scanning carriages whose position relative to each other is adjusted in accordance with the desired reduction mode to maintain constant total conjugate length. The selected reduction mode, in a continuous range of reduction modes, determines a unique trajectory (in scan and rescan movements) for the scanning carriage assembly comprising the pair of carriages. The trajectory consists of acceleration, deceleration, constant velocity and stopping phases. The feedback loops referred to hereinbefore control the servo motor driving the scanning carriage assembly based upon the selected reduction mode, one loop operating at least in an acceleration phase and another operating in constant velocity phase of carriage motion.

Both feedback loops monitor the servo motor drive so as to derive both position and velocity information for the scanning carriage. The total length of the scanning carriage drive assembly movement, selected in dependence upon the desired reduction mode, is stored in a position counter, and decremented as the servo motor drives the scanning carriage assembly. At various times during the acceleration phase of the scanning carriage drive assembly movement, the actual position of the scanning drive assembly is compared to the theoretically desired position for the scanning carriage drive assembly at that point in time. The error is employed in a first feedback loop to modify a substantially constant current provided to the servo motor for accelerating the scanning carriage assembly. As the scanning carriage drive assembly reaches the end of its acceleration phase, the comparison is terminated and a second feedback loop is enabled to control the constant velocity portion of the scanning carriage drive assembly movement. In this feedback loop, servo motor velocity is compared with main drum motor velocity so as to maintain a constant ratio, which ratio is selected in accordance with the desired reduction mode in a continuous range of reduction modes. The position of the scanning carriage drive assembly throughout the constant velocity phase of its trajectory is monitored and, as the constant velocity phase terminated, the first mentioned feedback loop may again be enabled and the second feedback loop is disabled to provide for deceleration of the scanning carriage drive assembly in a controlled manner. In a varient on this first embodiment of the invention, deceleration is open loop.

The variables of scan length, scan speed and relative scan time can be related in a number of ways within the scope of the invention. For example, assuming fixed acceleration, the time to reach various velocities or velocity ratios is different, however, the time at which image transfer begins must be constant relative to drum motion to insure that the image occupies the identical image area regardless of reduction ratio. The beginning of carriage movement, relative to drum position, can be different for each of the various reduction ratios to insure that the image, laid down in the constant velocity phase of carriage motion, appears at the proper location on the drum. This can be implemented by delaying start of carriage motion uniquely for each reduction ratio.

The necessity for such unique delay can be eliminated, however, by altering the location from which motion starts so that the motion starts at the same time relative to drum position for all reduction ratios. Since 1:1 or lower reduction ratios require lower velocity than higher reduction ratios, the carriage will come up to scan velocity earlier for 1:1 or low reduction ratios. This is compensated for by merely lengthening the constant velocity phase of travel by the distance travelled at constant velocity in excess of that required for copying. With this technique, the unique delays for start of scan at different reduction ratios can be eliminated.

In another embodiment of the invention, carriage motion is controlled by a single control loop throughout the different phases of motion. The driving force in the loop is obtained by the pulse outputs of a counter on overflow (or underflow), each such pulse representing a fixed extent of travel. The counter is cycled by a clock, phase locked to the image carrier motion. The loop controls both velocity and position of the carriage motion through the agency of a device for selectively presetting the counter in a unique pattern related to each desired reduction mode and corresponding to unique carriage trajectories. That is, at the beginning of motion the counter may not be preset so the pulse output is produced at a low rate related to only image carrier motion. As the carriage picks up speed, however, the counter is preset to different positions so the pulse output rate is increased. Carriage position changes are used to decrement a second counter which is incremented by the pulse output so that real time position error is reflected by the contents of the second counter. The D to A converted output of the second counter drives the servo motor. The presetting pattern of the first counter is selected so that carriage motion reaches desired velocity at the proper position and time. Thereafter, by maintaining constant the presetting of the first counter a steady state condition is reached providing for constant velocity motion. In similar fashion, the carriage can be decelerated to a stop by continuing with the presetting pattern. Since the presetting pattern for any reduction ratio is precalculated to achieve the desired trajectory, merely selecting the pattern and initiating operation when the carriage and carrier are in known positions results in the carriage describing the desired motion with respect to the carrier. Since the loop keeps track of carriage position to a tolerance less than the movement corresponding to a single output pulse, motion is repeatable to within the same tolerance.

In the preceding discussion, phrases such as reduction ratios selected within a continuous range of ratios or velocities selected in a continuous range of velocities have been used. The selected reduction ratio is determined by lens position. Since lens position is determined or measured in a digital fashion, there is not, in absolute terms, a continuous range of ratios, but, in fact, only those ratios which correspond to a discrete (digital) measurement of lens position. However, the large number of such positions (for example, ninety) results in a copier which, for all practical purposes, possesses a continuous range of reduction ratios, since the reduction range of 1:0.647 is divided into ninety steps. In practical effect, the largest non-unity ratio is 0.992812 and the smallest non 0.647 ratio is 0.654188. Thus, in practical terms, the difference between a machine with an absolutely continuous range of reduction ratios and the machines disclosed herein is the fact that only ninety reduction ratios are available rather than a theoretically infinite number. The ninety ratios, however, are in practical effect continuous since the eye cannot discern the difference between a reduction ratio of 0.992812 and a non-unity but higher ratio, for example.

In the preceding duscussion, and in preferred embodiments to be disclosed hereinafter, the feedback loop detects servo motor velocity and position, although, of course, it is the scanning carriage drive assembly motion which is being controlled. Those skilled in the art will perceive that it is not necessary to monitor the servo motor, and instead, the scanning carriage drive assembly position itself can be monitored. In addition, since both the controlled object, that is, the carriage drive assembly, and in some phases, the operation of the controlling source, i.e., the drum motor, are mechanical components, the electrical control system must take into account the characteristics of these mechanical components. More particularly, the servo loop should insure that the error or control signal does not excite the scanning carriage drive assembly at a resonant frequency. This is effected in a preferred embodiment of the invention by limiting the control signals to frequencies less than (and actually substantially less than) the resonant frequency of the scanning carriage drive assembly. In the preferred embodiment to be disclosed hereinafter, electrical signals in the frequency region above 30 Hz. are attenuated. Because the main motor is intended to be driven by a commercial power source, i.e., for example, 60 Hz. , one can expect a relatively strong 60 Hz. component in the drum motion, and indeed, such motion is normally found. Since this motion is above the frequency at which control signals are attenuated, the scanning carriage assembly is not corrected for perturbations at this frequency. To overcome this potential problem, the drum is actually driven through a "soft" coupling from the main motor. The soft coupling is actually a rubber or rubber-like section of the drive shaft which damps the 60 Hz. perturbations in the shaft motion. The use of this technique is not, however, essential, for if the scanning carriage assembly resonant frequency can be increased substantially above 60 Hz., the control loop may follow perturbations at this rate, thus eliminating the need for this coupling.

Thus, in accordance with the invention, the scanning electrophotographic copying machine is provided for copying at substantially any reduction ratio within a range of reduction ratios comprising:

a motor, image carrier means driven by said motor for recording a latent optical image thereon, a transparent document support, a lens, reduction means for positioning said lens between said support and said image carrier means at a unique position corresponding to a selected reduction ratio within said range, scanning carriage means for scanning said document support and for directing an image beam from said document support to said lens, and servo motor means responsive to said reduction means for driving said scanning carriage for movement uniquely selected in accordance with said reduction ratio.

In a first embodiment of the invention, the servo motor is alternately coupled to plural, partially overlapping feedback loops. The first feedback loop is employed during acceleration phase and may be employed in deceleration phase of scanning carriage assembly motion, and during these phases, plural corrections can be made for errors between scanning carriage assembly position and theoretically desired position. The second feedback loop is operative during constant velocity phase of the motion and in effect, maintains a constant ratio between the carriage velocity and the carrier velocity for each reduction mode in a range of reduction modes. Finally, a third feedback loop can be used for precise position control at the conclusion of scan.

In another embodiment of the invention, only a single control loop is employed, a servo motor is employed to drive a scanning carriage assembly, and the motor is driven by the output of a bi-directional counter, the counter may be counted in one direction in response to servo motor feedback signals and is counted in an opposite direction in response to driving pulses, so that the bi-directional counter maintains a real time count of scanning carriage assembly position error. The driving pulses are produced by the overflow (or underflow) of a first counter which is cycled or clocked at a rate controlled by the motion of the image carrier.

The first counter may be preset in a predetermined pattern so that the driving pulses produced in overflow or underflow are produced in accordance with the desired velocity of the scanning carriage assembly. The pattern of presetting is predetermined for each of a plurality of reduction ratios in the range of reduction ratios so that each different presetting pattern produces a different velocity trajectory for the scanning carriage assembly and correspondingly produces movement of the scanning carriage assembly over a different unique distance where each distance is uniquely selected in accordance with a selected reduction ratio.

BRIEF DESCRIPTION OF THE DRAWINGS

In the drawings referred to herein, identical apparatus is identified by identical reference characters

FIG. 4 shows operation of the reduction mode indicators 91, 93;

FIG. 5 illustrates interrelation of lens positioning and scanning carriage positioning;

FIG. 6 illustrates plural velocity profiles;

FIGS. 7–10 relate to a first embodiment wherein:

FIG. 7 is a part schematic, part block diagram of the control 15;

FIG. 8 is a schematic of Interface 100;

FIGS. 9a–9c are a flow diagram of processor operation;

FIG. 10 is a block diagram of the reference clock;

FIGS. 11–14 relate to a second embodiment wherein:

FIG. 11 is a block diagram of the control 15;

FIG. 12a is a schematic of clock 401 and FIG. 12b shows representative waveforms;

FIG. 13 is a schematic of load logic 402 and counter 403; and

FIG. 14 is a schematic of sign and count logic, and bias up or down logic.

DETAILED DESCRIPTION OF PREFERRED EMBODIMENTS

Figure 1:
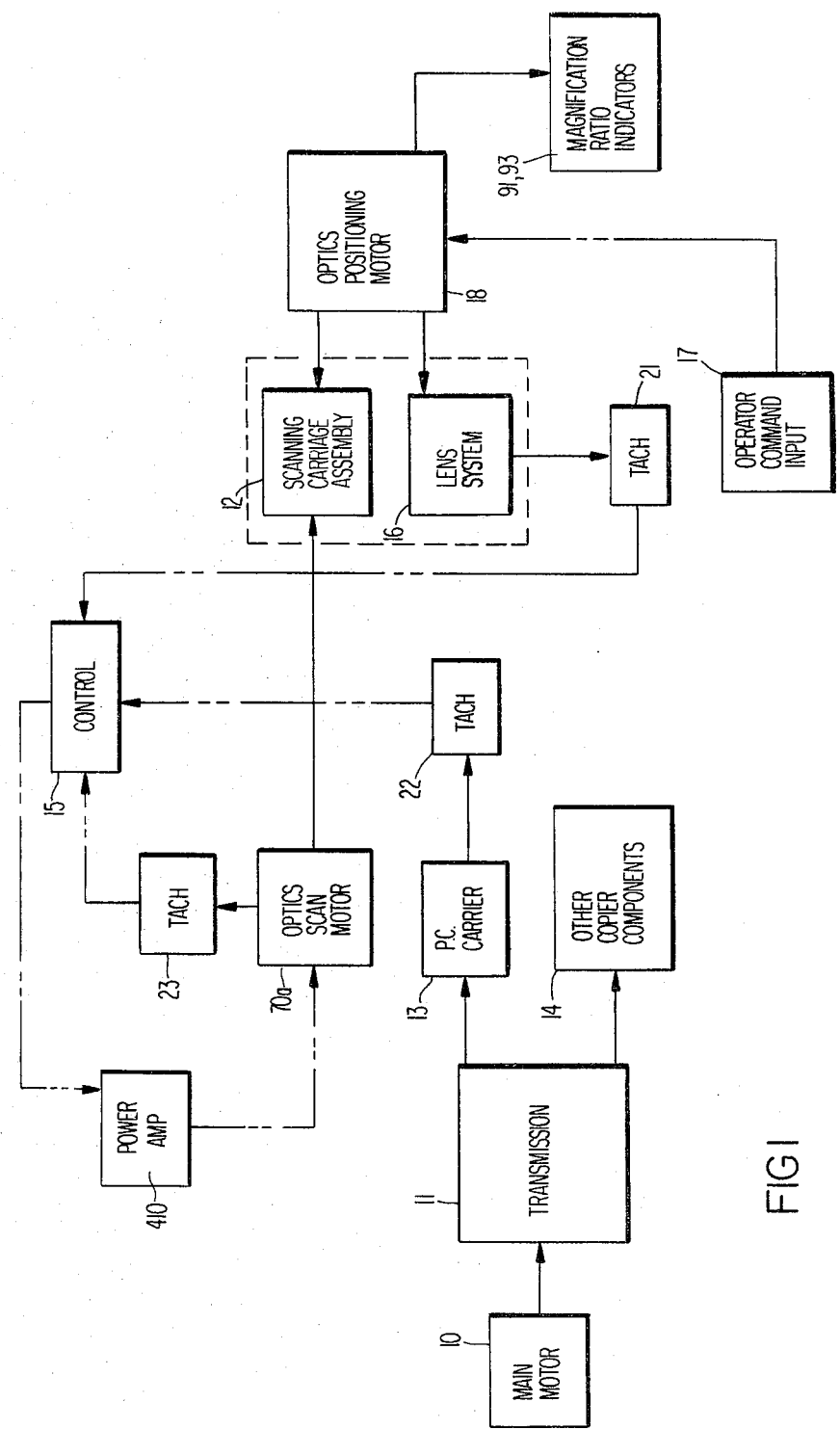
FIG. 1 is a block diagram of the invention.

FIG. 1 shows a block diagram of preferred embodiments of the invention; in FIG. 1, major components or subsystems are shown in block diagram fashion, solid lines indicate mechanical couplings and broken lines indicate electrical couplings. A main motor 10 is connected through a transmission 11 for driving the image carrier 13 (which may be a drum) and to other major copier components 14. A lens positioning system 16 positions the lens in response to operator command inputs at 17 via a motor 18. As the motor 18 changes lens position, indicators 91, 93 provide the operator with information which indicates when changes in reduction ratio can be terminated. The same motor 18 provides carriage positioning for total conjugate length to insure correct total conjugate length as indicated by the coupling between the motor 18 and the scanning carriage assembly 12. As explained in the referenced application, total conjugate length must be adjusted as the reduction mode is changed. Finally, a control 15 responds to a variety of inputs (including lens tach 21, a carrier tach 22, a motor tach 23, and various operator input commands 17 such as the number of copies to be produced) to properly control the scanning carriage assembly 12 for document reproduction. Control 15 develops an analog drive signal that is an input to the power amplifier 410 that drives the optics scan motor 70a. Rotation of the optics scan motor is monitored by tach 23. The output from tach 23 is fed back to control 15.

Figure 2:
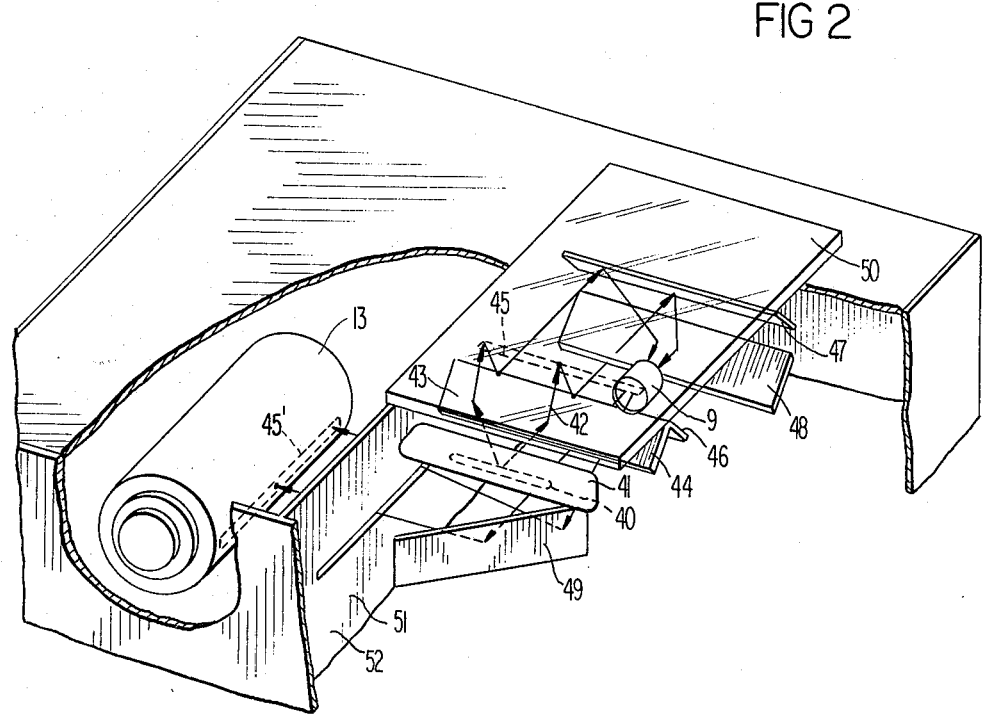
FIG. 2 is a partially broken away illustration of the optical path and associated components.

FIG. 2 illustrates the physical relation between the major components used in transferring an image from a document to the image carrier. A document to be copied, usually of rectangular shape, is placed on a glass platen or support 50. The document may be centered along a reference edge or corner referenced. Regardless of how the document is positioned, a scanning carriage assembly located under the document glass, moves across the under surface of the document, exposing the document with a long rectangular and moving area of light henceforth referred to as a moving line of light 45. The assembly includes a pair of carriages, one carrying a light source 40 and a reflector 41, as well as reflectors 44, 46 and a second carrying the reflectors 47, 48. The carriages and the rails on which they travel have been deflected from FIG. 2. The reflected image from the moving line of light is directed through an optical system including the reflectors 46–48 and a lens 9 to a reflector 49 and then to an image carrier 13 (hereinafter referred to as a rotating drum, the surface of which may be comprised of a photodetecting material carrying electrical charge). The reflection from the moving line of light produces a line image 45' of the illuminated portion 45 of the document. The speed relationship between the scanning carriage assembly and the tangential velocity of the drum is constant and of a desired ratio (during image transfer) to give the desired reduction, for example, a 1:1 speed ratio provides for a full size reproduction. As a result of the scan, an electrophotographic latent image of the document is produced on the photodetector. This image is then passed through a developer station in which toner material is deposited on the latent image causing the toner to adhere to certain areas of the photodetector and not to others, depending on whether or not light has been transmitted to the drum discharging the electrical charge previously placed thereon. In plain paper copiers, the developed image is then passed through a transfer station where the image is transferred to a copy paper sheet. The copy paper is then passed through a fusing station wherein the toner is fused to the paper to permanently affix the image. Meanwhile, the drum continues to rotate through a cleaning station where residual toner charge is removed from the surface of the drum prior to beginning the next copy cycle.

In coated paper copiers, the same basic operation occurs except that the photoconducting material is located on the copy paper itself. Accordingly, the speed of the scanning and the speed of the copy paper during the image transfer process must be matched in the appropriate ratio for the selected reduction. The present invention is applicable to both plain and coated paper copiers.

In the typical electrophotographic plain paper copier, the leading edge of the copy paper must be brought into juxtaposition with the drum at the transfer station to coincide with the leading edge of the image area. If the document is to be copied at a 1:1 ratio onto a copy sheet of exactly the same size, it is also necessary to provide the leading edge of the document image at the leading edge of the image area so that the entirety of the document can be transferred to the copy sheet. The same holds true when a larger document is being reduced so that the entire document image completely fills the image area of the drum. Typical document copier such as the IBM Copier II or Series III provides the necessary mechanisms for timing the relationship of copy paper leading edge to image area in order to provide this function. The same function is performed in coated paper copiers except that the leading edge of the copy paper must match the leading edge of the image.

Figure 3:
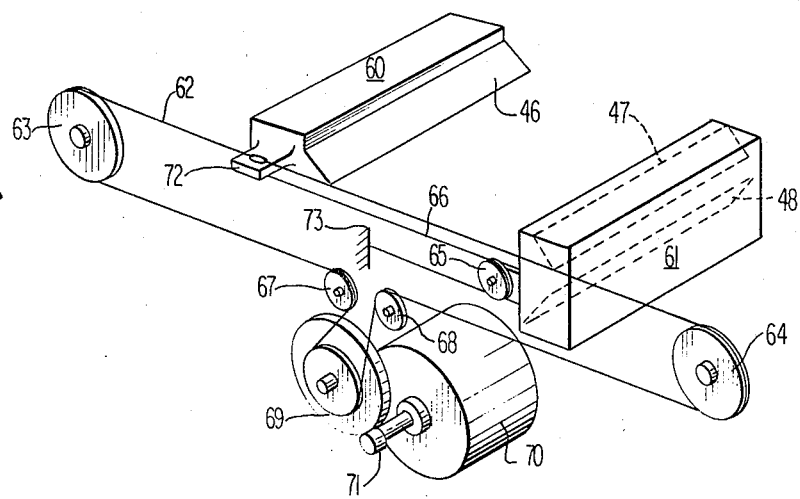
FIG. 3 shows the scanning carriage assembly and the manner in which it is driven.

FIGS. 2A and 2B and the associated text of the referenced application describe the need for TCL correction while FIGS. 4, 5 and the associated text describe how the respective carriages are positioned and moved to alter the TCL correction for various reduction ratios and to maintain the correction throughout the scanning movement of the carriages. The need for TCL correction is identical in the present invention and the correction is achieved in a similar fashion. More particularly, FIG. 3 is a schematic showing of a pair of carriages, a first carriage 60 and a second carriage 61, which move across the document glass 50 to move the line of light from one end of the document glass to the other. Scanning carriage 60 includes the source of illumination (not illustrated) and the first mirror 46. The scanning carriage 61 carries the mirrors 47 and 48. The two scanning carriages 60 and 61 are mounted for movement along parallel rails (not illustrated) and are driven along the rails by belts or bands 62 and 66. The first belt 62 comprises an endless belt which is connected to an arm 72 of the first carriage 60. The endless belt 62 is supported over pulleys 63, 64 and 67, 68 and is driven by a drive pulley 69 which itself is driven from the drive shaft 71 of a servo motor 70. Thus, the movement of carriage 60 is proportional to the rotation of the drive shaft 71 as reflected by the ratios of the driving elements of the pulley 69. The carriage 61 is driven through a belt or band 66 which extends from a ground point 73 over a pulley 65 supported on the carriage 61 and which terminates at the arm 72 of the carriage 60. Because of the motion multiplying arrangement, which is shown in FIG. 3, the movement of the two carriages is not equal, but carriage 61 moves exactly one half the distance moved by carriage 60, and this maintains the total conjugate length constant as is taught in the first-mentioned application. In the remaining part of the application, the motion of the carriage 60 will be referred to as a motion of the scanning carriage drive assembly, it being understood that motion of the carriage 61, while not equal to the motion of the carriage 60, is related thereto. Of course, other driving arrangements can be implemented well within the ordinary skill, such as other composite cable and pulley arrangements, steel bands instead of the cables, or a nut and lead screw arrangement.

FIGS. 4 and 5 (the former reproduced from the aforementioned application and the latter somewhat modified) illustrate the scanning carriages 60 and 61 (the rails on which these carriages ride are not illustrated for clarity) along with the lens 9 (likewise, the rails on which the lens 9 rides are also not illustrated for purposes of clarity). Also illustrated in these Figures is apparatus for feeding back information to the operator to inform him when the lens is correctly positioned for the document intended to be copied. The document is positioned in the document glass in the manner shown in FIG. 4, at the reference corner. Positioning indicators 91 and 93 are moved simultaneously by the operator to encompass the outer edges of the document in two dimensions. By observing the position of the indicators 91 and 93, relative to the document, the operator knows when he has the system adjusted such that the entirety of the document is encompassed by the indicators and will therefore be transmitted to the document image area when he initiates the copying process. As shown in FIG. 5, indicating pointers 91 and 93 are operated by optics positioning motor 18, a cable 88, pulley 125, cable 94 and pulley 95. If pulley 95 is rotated in direction D, then cable 96 rotates to move positioning indicator 93 in a direction to encompass a larger and larger document. Similarly, positioning indicator 91 moves to encompass a larger document along the other dimension. The positioning indicators 91 and 93 may move at any selected ratio depending upon the nominal sizes of paper most frequently copied.

Under operator control, therefore, the motor 18 is rotated in one direction or another depending on whether or not a larger or smaller document is to be copied than the document size indicated by the position of the indicators. Assuming a larger size document is to be copied, the motor is energized in a particular direction and the indicators 91 and 93 are moved accordingly. At the same time, the cable 88 rotates the lens cam 89 which is coupled to the lens 9 for proper positioning thereof so that when the operator deenergizes the motor 18, the lens is properly positioned for the desired reduction. The required motion of lens 9 as reduction mode is varied is adequately disclosed in the referenced application.

The same movement of the cable 88 also provides for rotation of the cam 90 which serves, as is disclosed in the aforementioned application, to adjust the ground point 73 so as to properly position carriage 61 for the associated total conjugate length in accordance with the desired reduction mode.

It should be apparent, therefore, that the operator control in locating indicators 91 and 93 results in positioning the lens 9, and the carriage 61 at a selected position within a continuous range corresponding to the selected reduction mode in a continuous range of reduction modes.

The remaining parameters to be adjusted to provide for continuous reduction are the scan length for the carriages, and the velocity profile. In addition, in order to provide for coincidence between the leading edge of the document image and the image area on the drum, account must be made of the proper starting time of carriage motion, relative to drum position.

FIG. 6 illustrates the carriage assembly velocity profile (i.e., velocity vs. time) for five different reduction modes in a continuous range of reduction modes from 1:1 to 0.647:1. It is emphasized that the five discrete profiles shown here are for illustrative purposes only, and that, depending upon the reduction mode selected and therefore the lens position, the apparatus is also capable of providing intermediate velocity profiles not specifically illustrated.

As is apparent, each velocity profile has three distinct phases: an acceleration phase, a constant velocity phase and a deceleration phase. All the profiles of FIG. 6 illustrate carriage motion toward the "home", reference or rest position which is the scanning phase of machine operation in which an image is written onto the drum. The "constant velocity phase" is only nominally constant in that the velocity during this phase bears a specified relationship with the tangential velocity of the drum 13. Thus, in the 1:1 reduction mode, the scanning carriage velocity is maintained equal to drum tangential velocity, and in other modes, the scanning carriage velocity is the drum tangential velocity divided by the reduction mode, and the mode is in a range of 1.0 to 0.647. It should be noted that the constant velocity phase is, in extent of time duration, equivalent for all profiles.

Because some of the reduction modes provide for higher carriage velocity than others, the carriage in these modes travels a greater distance in the constant velocity phase than the distance covered during the constant velocity phase in the 1:1 mode. Thus, for example, in the 0.647:1 mode, a 17-inch document is scanned in the same time as it takes the drum to rotate a distance sufficient to lay down an image of an 11-inch document. Accordingly, the 17-inch document is reduced in size to that of an 11-inch document. Since the velocities for the different modes are inversely proportional to the reduction factor, this holds true for any selected reduction mode in a continuous range of reduction modes.

FIG. 6 shows trajectories whose starting times $t_1 - t_5$ relative to drum position, are different for each trajectory. As mentioned above, however, preferably, the scan starting time, relative to drum position, is identical. This can be effected by lengthening the scan time duration as shown dotted in FIG. 6. Thus, the lowest velocity trajectory rather than starting at time $t_1$ (after time $t_5$, the starting time for the highest velocity trajectory) also starts at time $t_5$. Accordingly, the carriage reaches its constant velocity at time $t_6$ (rather than at the time $t_7$). Thus, the constant velocity phase of movement is lengthened in time by the difference between times $t_6$ and $t_7$. By utilizing the same procedure, the scan start time can be identical for each mode, i.e., $t_5$. Using this technique, the time duration of the constant velocity phase of motion differs for each mode although the time during which the image is created is still identical for all modes.

As mentioned above, when not operating, the carriage is in a home or reference position. Before scanning can take place, the carriage must be rescanned, since scanning takes place toward the home position. The distance through which the carriage is scanned (and therefore rescanned) depends on the reduction mode for reasons which will now be explained. It should be clear that the distance the carriage travels during the constant velocity phase is related (perhaps directly) to the amount of reduction taking place. In addition to this distance, however, the carriage must be rescanned sufficiently far to allow for the acceleration phase of its movement during scanning. In one preferred embodiment of the invention, a common acceleration is employed for all accelerating movements and thus the acceleration phase, in terms of time or distance, lasts longer for those trajectories with higher constant velocity phase. Typically, therefore, the carriage is rescanned by a unique distance which is related to the selected reduction mode in a continuous range of reduction modes. This rescan distance may be increased from this value to a different but also unique value if, as in one preferred embodiment, it is desired to employ a common starting time for all trajectories. Once the carriage is properly rescanned, it is ready for movement in the scanning direction but that movement must be timed properly relative to the image area on the drum so that the leading edge of the image is laid down at the leading edge of the drum image area, e.g., see FIG. 6. The acceleration phase of the scanning movement is controlled so as to bring the carriage up to the desired velocity commensurate with the selected reduction mode. During the constant velocity phase of the motion, the carriage velocity is locked to the drum so that the velocity ratio is constant at the desired reduction mode. At the conclusion of the constant velocity phase of the carriage movement, it is decelerated and stops at the home position.

Figure 7:
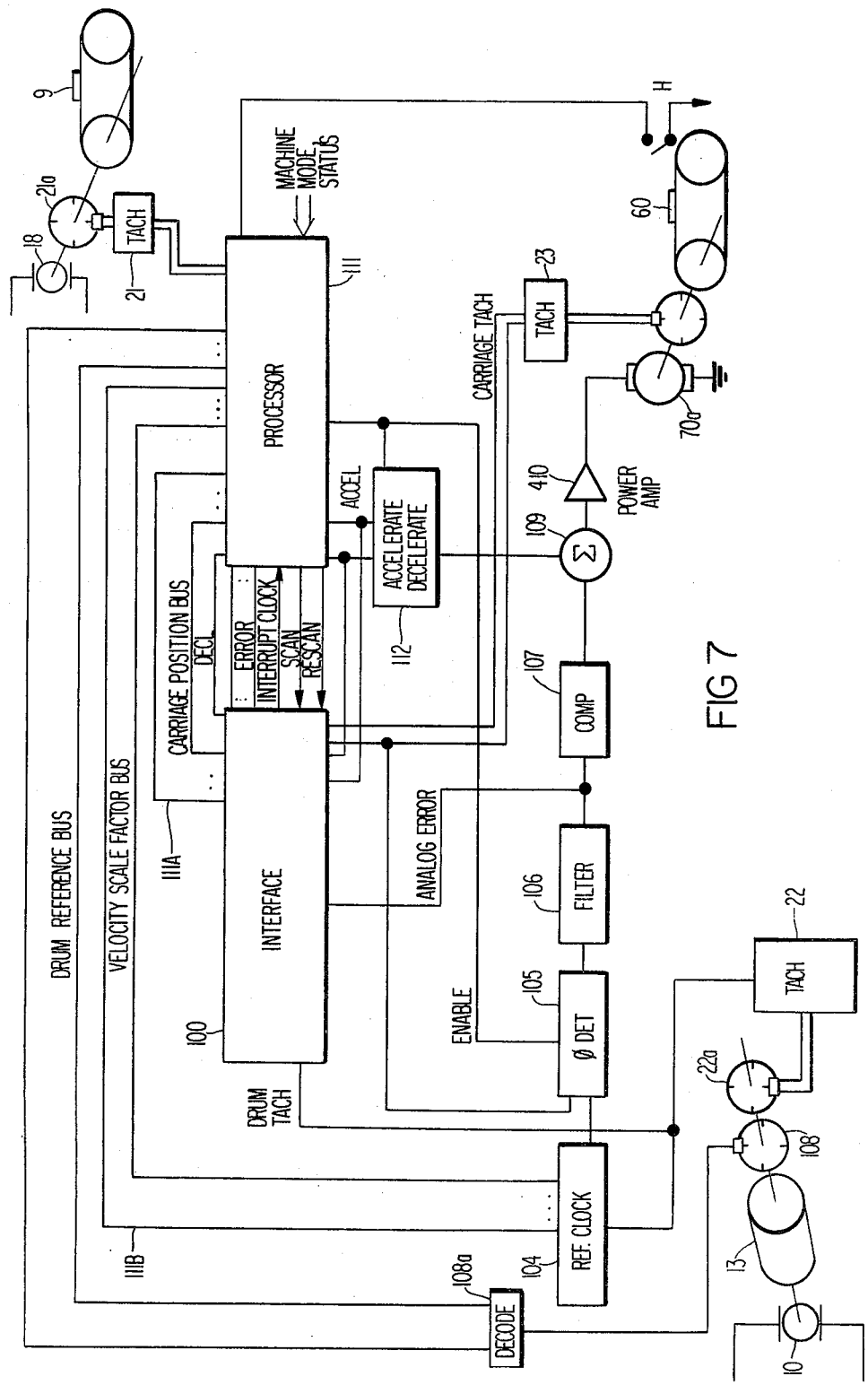

FIG. 7 is a block diagram of the apparatus to control the carriage movement in accordance with the foregoing description noted CONTROL 15 in FIG. 1.

FIG. 7 illustrates the major components for producing the desired carriage motion as well as the components which control such motion. More particularly, the drum 13 is illustrated at the left and it is associated with a tachometer 22. In addition, at the upper right, the lens motor 18 is shown controlling the position of the lens 9. The lens position is sensed by a lens tachometer 21 (and 21a) which provides an input to a processor 111. The servomotor 70a which drives the carriage 60 is also illustrated associated with a carriage tachometer 23. A home switch H is shown which is normally open and closed when the carriage is in its home or reference position.

The major components included in the control loop include a reference clock 104, phase detector 105, filter 106, compensation network 107, summing device 109, power amplifier 410, servomotor 70a, a tachometer 23, and interface 100. During the constant velocity phase of motion, the reference clock outputs a pulse train proportional to velocity of drum 13, with a proportionality factor selected by processor 111 in dependence on the selected reduction mode. Speed of servomotor 70a (and hence, carriage assembly 60) is sensed by tachometer 23 and coupled to phase detector 105. Velocity error signal from phase detector 105 is filtered and compensated and coupled to the power amplifier 410 to correct for the speed error. At the beginning of carriage travel processor 111 loads a (position) counter in the interface 100 with a quantity related to desired travel length. The (position) counter is decremented by the tachometer output; the counter contents therefore represent the difference between carriage position and the end point of carriage travel. A second counter is incremented from zero during acceleration. Periodically, as referenced to drum motion, the processor 111 is interrupted and present carriage position from the start of travel (contained in the second counter) is compared to desired position contained in a table in processor memory. The difference, or error, is converted to analog form and may be used to regulate the accelerating signal to maintain the carriage on the desired trajectory. At the conclusion of acceleration, the second counter is stopped. Deceleration can be initiated when the counts in the position counter and the second counter compare. Deceleration can be open or closed loop. In closed loop deceleration, the processor in interrupted and actual carriage position is compared with desired position and an error signal is developed to control the deceleration. At the conclusion of the decelerating phase of motion, the position counter may be used to drive the carriage to the proper position, either home or its rescanned location.

Once the carriage is in the scanning position, the initiation of scanning is determined with reference to drum position. Since the carriage follows constant acceleration, more time is required to accelerate to a higher speed than to accelerate to a lower speed. The time taken to reach desired velocity can be expressed as K/M, where M is the reduction mode, i.e., from 1.0 to 0.647 and K is a constant, in one embodiment 0.035.

Before describing the detailed structure and operation of the apparatus shown in FIG. 7, an overview of the operation performed thereby is presented.

When power is applied, processor 111 checks that the carriage is in the home position by noting the condition of the home position switch H. In the stand-by mode, the carriage is maintained in this position by the interface 100. The processor 111 determines whether or not the machine is in reduction by noting the position of the lens 9 as reflected by the accumulated signals from the lens tachometer 21. From the position of the lens 9, the reduction mode is determined and a velocity scale factor is calculated. In one embodiment, carriage velocity at 1:1 was 13.6″/sec., and for other reduction modes is 13.6/M. For each different reduction mode, the carriage travels a unique distance in the scan and rescan movements, and this distance is also determined. While the distance could be calculated, in one preferred embodiment of the invention, a table in the processor 111 stores distance counts (of tach 23) versus reduction modes and the processor determines the distance to be travelled by a table look up. In addition, the acceleration time is also computed, again based on the formula described above. Actually, the processor determines how many times it may be interrupted during acceleration to make corrections. This is proportional to the acceleration time, at least to a first approximation. When the foregoing functions have been completed, the processor awaits energization of the start button by the operator.

When that function is accomplished, the total distance to be moved by the carriage, computed as above, is loaded into the position counter in interface 100 in terms of a number of tachometer pulses via bus 111A. In addition, the appropriate velocity scale factor is loaded into the reference clock 104 via bus 111B. For rescan, the velocity used is the highest available regardless of the reduction mode, that is, on rescan the velocity is 13.6/M″/sec. where M is the smallest avaiable, i.e., 0.647. The processor 111 then monitors drum position via the encoder 108, decoder 108a and the accelerate signal (ACCEL) is provided to the summer 109 via unit 112, allowing the carriage to accelerate at the proper time. Encoder 108 can recognize a plurality of unique drum positions for starting carriage acceleration, one for reduction mode, and others, in a 1:1 mode for various paper lengths. Accordingly, decoder 108a raises a line corresponding to the unique drum position for start of acceleration in a reduction mode and the processor 111 responds by outputting ACCEL to accelerate unit 112. The accelerate/decelerate unit 112 is merely a voltage source for summer 109. In response to ACCEL, a particular voltage is provided to summer 109 which corresponds, in amplitude, to that voltage necessary to cause carriage acceleration at the selected rate of acceleration. Another voltage level, with appropriate polarity, is employed for deceleration which is produced in response to DECL. Finally, in response to ACCEL, DECL or constant velocity motion, a small level is applied to summer 109 to compensate for friction effects. At the same time, processor 111 ensures that the phase detector 105 is disabled.

Simultaneously, with ACCEL the phase detector 105 is disabled so that during the acceleration phase of carriage movement it plays no part in controlling the servo motor 70a. In addition, an interrupt clock in interface 100 is initiated, and the processor 111 is periodically interrupted by the clock. The clock is derived from the drum tachometer 22 in a manner to be explained.

At periodic intervals, governed by the interrupt clock, the processor reads the carriage position over carriage position bus 111A from an acceleration counter which counts tachometer pulses during the acceleration phase of motion. The processor 111 then compares actual position with a theoretical position for the carriage. While the theoretical position of the carriage could be computed repeatedly during the interrupt phase of the processor operation, in a preferred embodiment of the invention, a table is provided, entry into which is determined by the particular interrupt for a selected reduction mode; the table providing the theoretical or desired carriage position count. Processor 111 then computes the error (the difference between the counts) and provides an error correction input to a digital to analog converter within interface 100 via ERROR bus. This error, converted to analog form and applied to summer 109 through compensation 107, maintains the carriage on the proper acceleration curve. This operation is repeated for each interrupt of the processor. On the next to last processor interrupt, the phase detector 105 is enabled. On the last processor interrupt, the signal ACCEL is removed. This terminates counting by the acceleration position counter, and disables the interrupt clock and the digital to analog converter. Enablement of the phase detector 105 completes a velocity error feedback loop to maintain the carriage velocity at a predetermined ratio with drum velocity, the ratio being determined by the scale factor loaded into the reference clock 104. Accordingly, the carriage is now locked to the drum movement. Continued movement of the carriage continues the decrementing action of the position counter. When the position counter reaches the count in the acceleration position counter, the phase detector 105 is again disabled and a logic signal DECL is provided from interface 100 to processor 111. In response, the processor 111 produces DECEL. The signal DECEL, at unit 112, produces a decelerating voltage to the summer 109. Accordingly, the servo motor 70a is decelerated until the carriage position counter gets to within a few counts of the desired position. At this point, the processor turns off the signal DECEL and the position counter is used to position the carriage.

At this point, the carriage now is positioned for scan. In one embodiment of the invention, deceleration is open loop. In another embodiment, deceleration is the mirror image of acceleration in that the acceleration position count may be compared to desired position and an error signal generated to maintain deceleration on the desired profile.

The processor 111 initiates the scanning movement again based on drum position as reflected by the position encoder 108. Prior to initiating scanning movement, however, the processor again sets the carriage position count for the desired movement back to the home position and now the reference clock 104 is loaded with a scale factor dependent upon the reduction mode. At the proper time, the signal ACCEL is again provided and the phase detector 105 is disabled. The interrupt clock begins again and the processor is continually interrupted, at periodic intervals, to compare actual carriage position with desired position and make the appropriate corrections. Several interrupts before the last (two, for example), the phase detector 105 is enabled, on a following interrupt, the signal ACCEL is removed and on the last interrupt, the digital to analog converter and the interrupt clock are disabled. The carriage is now locked to the drum movement through the velocity error loop at the desired velocity. During this movement, the position counter is continually decremented, and when the signal DECEL is provided much as in rescan, the phase detector 105 is disabled, and the carriage decelerates until the position counter comes within a predetermined range of the home position. At this point, the processor 111 removes the signal DECEL and the position count is used to stop the carriage at or adjacent the home position.

The apparatus to perform these functions is shown in FIG. 7 and includes three mechanical systems, interrelated to produce the desired effects. Firstly, the drum 13, which is driven open loop by the main AC motor 10, is used as a speed reference in the constant velocity phase of the carriage travel. The proportionality factor is determined by the selected reduction mode, and in order to determine what reduction has been selected, the position of lens 9 is monitored. Changes in position of the lens 9 produce tachometer signals on the tachometer 21 which are used to increment or decrement a register in the processor 111; accordingly, the register in processor 111 maintains a quantity related to the position of the lens 9 from which the reduction mode can be determined. Motion of the carriage itself is detected by a tachometer 23, and, during the constant velocity phase of motion, is fed back to the phase detector 105. Thus, one servo loop, in analog form, encompasses the reference clock 104, phase detector 105, filter 106, compensation network 107, power amp 410 and the motor 70a with the feedback path corresponding to tachometer signals input to the phase detector 105. (The summer 109 is used only to compensate for friction since the only other input during constant velocity phase of motion is the friction compensation level.)

In the acceleration or deceleration phases of movement, the phase detector 105 is disabled and a different feedback path may be employed. More particularly, the accelerate/decelerate signal from unit 112 is coupled as an input to the summer 109 which energizes the motor 70a to drive the carriage. Carriage position is monitored by the interface 100 which interrupts the processor 111 for a comparison. Any errors as noted by the processor are coupled through the ERROR bus, converted to analog form and coupled as an input to the compensation network 107 to enable the summer 109 to form an error signal which is the difference between its inputs. Accordingly, the preceding apparatus corresponds to a second feedback loop. As mentioned, the second feedback loop may be used only for acceleration purposes, or it can also be used during deceleration phases of motion as well.

Finally, there is still another feedback loop which is used to actually stop the carriage either at its home or start of scan position. In this loop, which is only enabled at the termination of the deceleration phase of motion, differences between the carriage position and desired position (zero or near zero count) are converted to analog form and are employed as a driving signal to drive that position error to zero.

Accordingly, the interface 100 and processor 111 exchange a plurality of signals therebetween. Initially, the extent of carriage position movement is transferred from the processor 111 over the carriage position bus 111a to the interface 100 where it is used to preset a counter (position) which will be decremented by the output of the carriage tachometer 23. In addition, the processor raises the scan or rescan signal to indicate what type of movement is to occur and may also raise ACCEL or DECEL at the appropriate times. Actually, the deceleration phase is initiated by the interface 100 in raising the signal DECL to the processor 111. In addition, the interface 100 provides the interrupt signal during acceleration and deceleration phases to enable the processor to make a comparison. Carriage position is transferred to the processor over the carriage position bus 111a for comparison purposes. Position error in acceleration and perhaps in deceleration phases is coupled back to the interface 100 over the ERROR bus where it forms an input to the digital-to-analog converter, DAC.

Further inputs to the processor 111 include the machine mode and status. For example, whether or not the operator has selected a reduction, and whether the machine is in stand-by or the start button has been pushed. Finally, the initiation of carriage motion is tied to unique positions of the drum 13. To detect drum position, a position encoder 108 rotates with the drum and a decoder 108a monitors the signals provided by the encoder. There may be, for example, unique drum position at which it is desired to start the rescanning and scanning movements in the reduction mode, and still other drum positions may be used for 1:1 mode with various paper lengths. Accordingly, the decoded drum position is coupled to the processor 111 over the reference bus.

FIG. 8 illustrates the components included in the interface 100. The carriage position counter is actually duplicated, and therefore comprises a pair of counters. In the embodiment shown in FIG. 8, each counter comprises serially connected pair of up/down counters. Thus, a first counter comprises counters 201, and 202, and the second counter comprises counters 203 and 204. These counters may be preset, in common from the carriage position bus 111a by the processor 111. Although the counters normally count down only, if the carriage overshoots its intended position, up counting may be necessary and this function is accomplished by logically gating signals from the tachometer 23 with the SCAN signal from the processor in the exclusive NOR gates 205, 206 and NAND gates 207, 208. Since scan and rescan states are mutually exclusive, a single signal will suffice.

A further counter is the acceleration position counter which again comprises a pair of serially connected up-/down counters 209, 210. This counter counts up during acceleration, and down during deceleration. This up-/down control is accomplished by gating the ACCEL and DECEL signals from the processor 111 with signals from the carriage tachometer 23 in a pair of NAND gates 211 and 212. The processor also provides a reset signal for counters 209, 210 to insure that the acceleration position counter starts counting from its zero state. Outputs of the acceleration position counter are coupled to the carriage position bus 111a from which their count is available at the processor 111 for purposes of comparison. In addition, the counter outputs are coupled to a comparator 213 where their count is compared to the carriage position count contained in the counters 203, 204. This comparison, as will be explained hereinafter, is employed to initiate the DECL signal which is also coupled to the processor 111. The outputs of the counters 203, 204 are also coupled to a further comparator 214 where the count is compared against zero, and when zeroed, the output is employed to disable the DECEL signal from the processor.

The interrupt clock to the processor is provided by a further counter 215. Inputs to this counter are generated by an OR gate 216 and a NAND gate 217. Inputs to OR gate 216 are the ACCEL and DECEL signals, from the processor. The input to NAND gate 217 is the output of OR gate 216 and a signal from the drum tachometer 22. Accordingly, when in either the accelerate or decelerate phase of motion, counter 215 is enabled to count; it will count a specified number of drum tachometer pulses before producing the interrupt output to the processor and reset itself. Accordingly, the processor is interrupted at equally spaced increments of drum travel.

At the conclusion of deceleration, the carriage has travelled the distance originally loaded into the counters 201, 202. However, since the position of the image which is laid down on the drum is determined by the travel of the carriage, an attempt has been made to avoid or minimize position errors. This is especially true at the conclusion of the rescanning movement since the location of the carriage at that time will be its starting position for the scanning movement. Accordingly, the output of the counters 201, 202 is monitored through a gating network 218, when enabled by the latch 219. Thus, when the gating network 218 is enabled, the condition of the counter 201, 202 is coupled via a plurality of exclusive OR gates 219 to a buffer 220. The buffer 220 provides an input to the digital to analog converter 221, whose output is the input to the compensation network 107, in the servo loop for the motor 70a. Thus, position error of the carriage produces a driving signal to energize the motor. Assuming that the carriage had not travelled the length desired, the counters 201, 202 contain a positive count and thus, the resulting voltage output of the digital to analog converter causes the motor to move the carriage in the direction of original motion. If, however, the carriage has overshot its desired position, or if succeeding motion causes the carriage to overshoot its desired position, the counters 201, 202 will count through zero and, as is well known to those skilled in the art, the immediately succeeding count will be a very high, albeit negative, number. However, the borrow line 222 will also go high, resetting a flip-flop 223 and raising the complement signal which forms the other input to the exclusive OR gate 219. This will cause the output of the digital to analog converter 221 to change sign which will result in reversal in the motor direction. This will be reflected by causing the counter now to count up, rather than down, by reason of the gates 205–208. Accordingly, the loop maintains an unambiguous reference at the zero point and drives the carriage to it, regardless of overshoots.

Since carriage motion also changes in direction between the rescan and scan motions, a latch 224 responds to appropriate signals from the processor to control the sign of the output of the digital to analog converter to maintain the carriage moving in the proper direction. Similarly, the SCAN signal from the processor is coupled as one input to one of the exclusive NOR gates 205, and this signal negatived by inverter 225 is the other input to the other exclusive NOR gate 206. As a result, as the carriage travels during the rescan operation, the counter is counting down. If the carriage stops before the counter has counted to zero, the remaining count in the counters 201, 202 produce an output voltage at the output of the digital to analog converter 221 of such a polarity to drive the carriage in the direction in which it had been travelling prior to stopping. If, however, the carriage passes the intended stopping point, the counter counts through zero and begins counting in effect, negative numbers. This would ordinarily result in a relatively high voltage, but this effect is prevented by the complementing action directed by flip-flop 223. The resulting voltage will drive the carriage in its opposite direction because of the sign change at the input to the DAC. The change in direction of carriage motion will be reflected in the tachometer output and accordingly, the counter will now count up, i.e., back towards zero. When the carriage has finally been properly positioned, the processor drops the RESCAN signal and raises the SCAN signal and again loads the counters 201, 202. When the carriage begins moving in its scan direction, i.e., opposite to the rescan direction, the counter still counts down since both the SCAN signal and the tachometer output are changed in polarity. At the conclusion of the scan motion, terminal operations are similar to the terminal operation of the rescan movement, i.e., if a carriage stops short of its intended stopping point, the low voltage out of the DAC will drive the carriage in the same direction in which it had been travelling, i.e., toward the stopping point, the sign change resulting from the counter counting through zero will cause the motor to reverse direction and drive the carriage toward its stopping point.

Figure 9C:
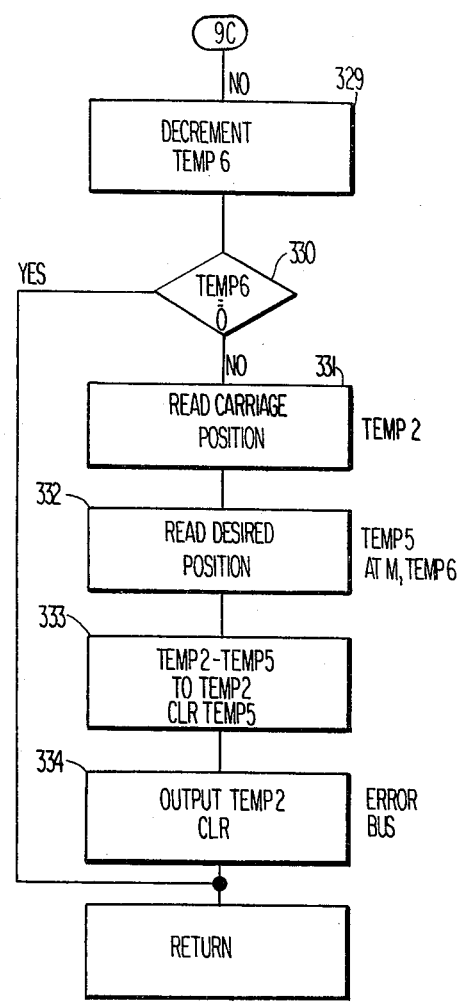

FIGS. 9A through 9C illustrate the operations carried out in the processor 111 in order to produce the necessary signals. The processor determines whether the ACCEL or DECEL signals are up or the phase detector is enabled. If neither of the signals are up and the phase detector is disabled, then the machine is truly in stand-by. At function 301, the processor determines the mode, which is a function of operator inputs; if in the reduction mode, the processor, at function 302, reads the lens position. As mentioned, the processor maintains a register in which lens position tachometer signals are integrated and thus, maintains a count corresponding to lens position. This count is directly related to the reduction mode M. Function 303 calculates, from the reduction mode, the velocity scale factor 1/M. In an embodiment of the invention in which constant velocity carriage travel is at 13.6 inches per second for 1:1 mode, the velocity in reduction is merely 13.6/M. When calculated, this quantity is stored in a register TEMP 1. Function 304 extracts carriage count and loads it into a further register TEMP 2. As mentioned previously, the processor maintains a table of carriage tachometer pulses versus reduction mode and thus function 304 merely requires reference to the table. If desired, the processor can be provided with a simple routine to interpolate if the selected reduction mode lies between entries in the table. On the other hand, this is not essential to the invention and function 304 could determine the closest table entry for the selected reduction mode and employ that count. Function 305 extracts the number of acceleration corrections or interrupts that are expected. This function is implemented employing a table similar to the table referred to with respect to function 304, and similar considerations respecting interpolation between table entries apply. Function 306 determines if the start button has been pressed. If it has not, the routine loops back and reperforms these functions until the start button depression is detected. When that occurs, function 307 outputs the carriage count from the register TEMP 2 and clears the same. The carriage count is placed on the carriage position bus and, as shown in FIG. 8 serves to load the pairs of counters with the identical count. Function 308 selects the maximum velocity scale factor and places that quantity on the velocity scale factor bus where it is loaded in the reference clock 104 (see FIG. 7). This implements the use of maximum velocity in the rescan operation, as mentioned. Function 309 resets the acceleration position counter by raising the signal RESET coupled to the resetting inputs of counters 209, 210 (FIG. 8). Function 310 refers to still another table to select the drum position for the start of acceleration signal and stores the same in a register TEMP 4. As mentioned, in a preferred embodiment of the invention, the start of acceleration is identical for all reduction modes, but the start of acceleration may vary for 1:1 mode operation depending upon the size of copy paper being employed. In any event, this value which corresponds to a unique drum position is loaded into the selected register. Function 311 compares the present drum position with the quantity in the register TEMP 4. Present drum position is reflected on the drum reference bus from decoder 108a. When the drum reaches the selected position, function 312 outputs RESCAN and ACCEL signals and clears the register TEMP 4. Function 313 disables the phase detector and the processor returns to stand-by since, once having launched the carriage by enabling the RESCAN and ACCEL signals, further control is on an interrupt basis.

FIGS. 9B and 9C illustrate the interrupt routine. As shown, when an interrupt is detected, function 314 determines if the ACCEL signal is up. If it is, then function 315 decrements the register TEMP 3, which is the register in which the number of corrections has been stored. Function 316 determines if that register has been decremented to zero. Assuming it has not, function 317 reads the carriage position. During the acceleration phase, carriage position is reflected in the acceleration position counter 209, 210 which signals are available at the processor over the carriage position bus. Carriage position is stored at a register TEMP 2. Function 320 reads the desired carriage position and loads that value into register TEMP 5. The value read is determined by the mode M and the particular interrupt which is the value stored at the present time in TEMP 3. Function 321 produces the difference, loads the same in TEMP 2 and clears TEMP 5. The difference is the error between desired carriage position and actual carriage position. Function 322 outputs that error on the ERROR bus where it is provided as an input to buffer 220 (see FIG. 7B). Function 323 determines if the value in TEMP 3 has been decremented to 2. Assuming it is not, function 324 determines if the quantity has been decremented to one. Again, assuming it has not, the routine is concluded until reception of the next interrupt.

This routine will be operated a number of times in a similar fashion, each iteration producing an error signal if there is a difference between present carriage position and desired carriage position which error is employed to maintain the carriage on the desired acceleration trajectory. When the quantity in the register TEMP 3 has been decremented to two, function 325, following function 323, will enable the phase detector 105 (see FIG. 7). As a result, a velocity error signal will begin to be produced. On the next iteration of the interrupt routine, function 326 following function 324 will disable the signal ACCEL. Finally, on the next iteration, the routine will note that TEMP 3 has been decremented to zero, and accordingly, function 327 will disable DAC 221.

The carriage now enters the constant velocity phase of motion which is controlled by the analog servo loop. Since the ACCEL signal has been disabled, counters 209, 210 are no longer capable of counting and therefore, they maintain a quantity corresponding to the number of carriage tachometer pulses produced during the acceleration phase of motion. However, the carriage position counters 201 through 204 continue decrementing throughout the constant velocity phase of motion. A discussion of operation of the analog servo loop will be postponed until a discussion of FIG. 10 which illustrates the reference clock 104 in detail. Suffice it to say, however, that the carriage velocity is maintained in a preselected relation to that of the drum 13.

The deceleration phase of carriage movement is initiated by comparing the static count in the counters 209, 210 with the continually decremented count in the counters 203, 204. Thus, when the remaining travel distance for the carriage is equal to the distance travelled during the acceleration phase, these counts are equal, and comparator 213 issues the DECL signal to the processor. In turn, the processor raises the DECEL signal. This signal is one input to NAND gate 212, which then allows the counters 209, 210 to begin counting down. In addition, the same signal is an input to OR gate 216 which allows counter 215 to count and to periodically produce interrupt clock to the processor.

Production of the DECL signal by comparator 213 results in applying a voltage to the summer 109 for the purpose of decelerating the carriage. In addition, phase detector 105 is disabled.

In one embodiment of the invention in which deceleration is accomplished open loop, no error signal is developed in the feedback path. In a preferred embodiment of the invention, however, the processor responds to the interrupt clock and compares carriage position from its intended stopping point to a theoretically desired position, and develops an error signal to maintain the carriage on the desired deceleration trajectory.

When the processor receives the first interrupt, from counter 215, in the interrupt routine function 314 determines that the DECEL signal is up, signifying the deceleration phase of motion. Function 329 decrements the register TEMP 6, which has been loaded (at function 305—FIG. 9A) with a number of corrections or interrupts in the acceleration or deceleration phase of motion. Function 330 checks whether the quantity contained in this register is equal to zero. Assuming it is not, function 331 reads the present carriage position from the carriage position bus and stores the quantity at TEMP 2. During deceleration phase of operation, the acceleration position counter 209, 210 contains a count corresponding to the present number of tachometer pulses between the carriage's present position and its intended stopping point. Accordingly, this is the count corresponding to the carriage position read at function 331.

Function 332 reads the desired position from a table. The desired position is contained in a table entered from the reduction mode M and at an entry corresponding to the present value contained in the register TEMP 6. Function 333 determines the difference therebetween, stores it at TEMP 2 and clears TEMP 5. Function 334 outputs the value in TEMP 2, i.e., the error, on the ERROR bus, and that concludes the particular iteration of the interrupt routine.

On succeeding passes of the error routine, similar operations occur. At the conclusion of the intended number of passes, the register TEMP 6 will have been decremented to zero, concluding the deceleration phase of operations.

The interface 100 also includes an additional comparator 214 which continually compares the quantity contained in counters 203, 204 to a predetermined reference quantity, such as zero. When the count in the counters 203, 204 reaches zero, the carriage has travelled its intended distance, and the output of the comparator coupled to the processor, disables the DECEL signal, thus removing the potential from summer 109. The same signal coupled to latch 219 enables the gating network 218.

Because of friction effects, which cannot be exactly predicted, as well as aging of component parts, etc., the actual zero point, or the point at which the deceleration signal is removed is in a range of values around the desired stopping point. Accordingly, that is the value used as a reference in comparator 214. At the same time, the carriage may stop short of its intended stopping point, or it actually may overshoot the stopping point. In either event, the counters 201, 202 will maintain a count corresponding to the carriage's position, and enablement of the dating network 218 allows that count to be coupled through exclusive OR gates 219 to a buffer 220. As has been mentioned above, the count may be complemented under control of the flip-flop 223 in the event that the carriage passes through the zero point. The buffer 220 enables this digital count to be made available to the digital to analog converter 221, wherein it is converted to an analog quantity which is applied to the compensation network 107 to allow it to energize the servo motor to drive the carriage toward its intended stopping point or zero position. Those skilled in the art will recognize that the driving voltage for the servo will only be reduced to zero when the count in the counters 201, 202 is reduced to zero. Accordingly, a further, or third, servo loop encompasses the output of the digital analog converter through the compensation network 107, summer 109, amplifier 410, a servo 70a, a feedback path through the tachometer to the gates 205-208, the counter 201, 202, gating network 218, exclusive OR gates 219 and buffer 220, back to the digital to analog converter 221.

The preceding discussion has described the rescan motion of the carriage, i.e., from its start or home position to its start of scan position. As has also been described, the particular count or distance through which the carriage travels depends upon the reduction mode selected by the operator if the machine is in the reduction mode. At the conclusion of rescan operation, i.e., when the carriage is properly positioned at the desired location, the scan operation may commence to drive the carriage back toward its home position and, during this pass, to transfer an image from the document to the image carrier. The scan motion includes acceleration, constant velocity, and deceleration phases. The operation is identical to the rescan save for the particular velocity scale factor used. In rescan, the maximum velocity scale factor is used whereas during scan, the computed velocity scale factor, computed in relation to the desired reduction mode, is employed.

The preceeding discussion describes, in detail, the acceleration, deceleration and stopping modes of operation. Constant velocity phase of motion will now be described.

Figure 10:
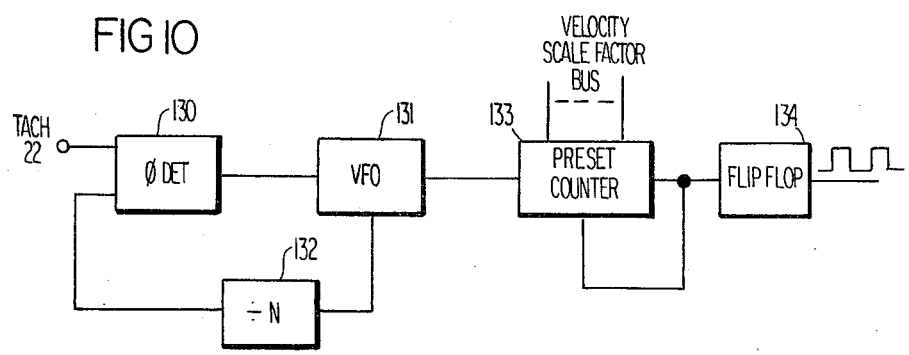

The block diagram of FIG. 7 shows the analog control loop employed during the constant velocity phase of motion. As mentioned above, the phase detector 105 is selectively enabled or disabled as the carriage travels through its various phases of motion. As the acceleration phase terminates, the carriage has been brought up to the proper velocity, and the phase detector 105 is enabled. Desired velocity for the carriage is proportional to image carrier velocity, i.e., the drum 13, with a selected proportionality factor selected in dependence upon the reduction mode M. The drum velocity is detected by the tachometer 22 which produces, as an input to reference clock 104, a train of pulses whose rate is related to the velocity of the drum 13. A further input to the reference clock 104 is the velocity scale factor from the velocity scale factor bus 111b. The output of the reference clock 104 is a pulse train whose rate is proportional to the input pulse train, by the proportionality factor transmitted on the velocity scale factor bus 111b. The other input to the phase detector 105 is a further pulse train from the carriage tachometer 23, whose rate is related to actual carriage velocity. The output of the phase detector 105 is a pulse train in which the pulse widths are related to the difference in the rates of the incoming pulses, i.e., the velocity error, and whose polarity depends upon whether or not the actual carriage velocity is greater than or less than the desired carriage velocity. The signal is low pass filtered in filter 106, passed through the compensation network 107 and applied as an error voltage to summer 109. The accelerate, decelerate module 112 which, during the acceleration or deceleration phases, applies a selected potential to the summer 109 to accelerate or decelerate the motor 70a, in the constant velocity phase, applies a much lower potential designed to overcome frictional effects. The algebraic sum of these potentials are employed as an input to the power amp 410 to energize the servo motor 70a, to maintain its velocity constant at the desired value. FIG. 10 illustrates the components in the reference clock 104.

As shown in FIG. 10, the output of the tachometer 22 is applied to a phase detector 130. The output of the phase detector 130 is a voltage level which is input t a voltage frequency controlled oscillator 131. The output of the voltage frequency oscillator is coupled to a divider 132 to provide an appropriate scale factor. The output of the divider 132 is coupled as the other input to the phase detector 130. The VFO 131 thus outputs a pulse train which is related in repetition rate to the output of the tachometer 22, by the proportionality factor N. This pulse train is input to a counter 133. Counter 133 is preset by the velocity scale factor bus 111b. The counter 133 produces an output each time it reaches its terminal count which clocks flip-flop 134 and also serves to allow the counter to be again preset to the quantity contained on the velocity scale factor bus. As will be apparent to those of ordinary skill in the art, the repetition rate at which the flip-flop is clocked is determined by the repetition rate of the output of the VFO 131 as well as the quantity to which the counter 133 is preset. The output of the flip-flop 134 is thus a pulse train with repetition rate which is related to these two quantities and which may be compared with the pulse train output of the carriage tachometer 23 to develop a velocity error signal.

A Second Preferred Embodiment

The preceding portion of the detailed description of a preferred embodiment has described a first preferred embodiment of the invention which employs multiple, overlapping servo loops to control, respectively, acceleration and deceleration, constant velocity, and stopping modes of operation of the scanning carriage assembly. In another preferred embodiment of the invention to be disclosed immediately hereinafter, only a single servo loop is employed to control the servo motor during acceleration, constant velocity, deceleration and stopping phases of motion.

The single control loop is similar to the control loop employed in the first preferred embodiment for constant velocity motion in that apparatus similar to the phase detector 105 is employed to compare a driving signal pulse train wherein each pulse represents a desired increment of motor travel, with a tachometer pulse train representative of actual travel, the difference therebetween utilized as an error signal to drive the motor. In the first preferred embodiment, the driving signal pulse train is produced in a counter which is clocked at a rate determined by the velocity of the image carrier, the pulse in the driving pulse train is produced each time the counter reaches a predetermined count, such as the terminal count, and in order to produce the driving pulse train of various repetition rates, so as to provide for various velocities of the scanning carriage assembly, the counter is preset each time it reaches the predetermined count, and the quantity to which it is preset, of course, is instrumental in determining the repetition rate of the driving pulse train. The second embodiment employs a similar arrangement except that acceleration and deceleration movements are also produced in the same control loop so as to eliminate the necessity for a different or further acceleration/deceleration control loop. This is simply implemented in practice by presetting the counter to different quantities during the course of carriage movement so as to produce acceleration, constant velocity motion and deceleration.

However, in contrast to the constant velocity control loop in the first embodiment, the apparatus corresponding to the phase detector consists of an up/down counter which enables the control loop not only to provide an appropriate error signal for errors corresponding to less than a driving or tach pulse, but to also maintain accurate tracking for errors actually comprising multiple driving or tach pulses. Accordingly, then, the single control loop produces a clocking signal which is synchronized to the image carrier velocity, for clocking a counter which is selectively preset in a predetermined pattern to produce the driving pulse signal which comprises a pulse train of variable repetition rate which is, itself, coupled to an input of the up/down counter, the other input to which is provided by the tachometer pulses. The up/down counter may count up (for rescan, for example) in response to driving signal pulses, and count up or down in response to the tachometer pulses depending upon the relation between the desired direction of motor travel and the actual direction of motor travel. For scan, the up down counter may count down in response to driving pulses and the tach pulses produce up or down counts depending on the direction relation. The real time contents of the up/down counter are converted to analog form and employed as the error signal to drive the servo motor.

In contrast to the first preferred embodiment of the invention, wherein a position counter is employed which is set at the beginning of a rescan movement to a quantity related to the desired travel of the carriage during the rescanning, and which is reset at the termination of the rescanning movement and prior to the scanning movement, the single control loop of the second embodiment eliminates the position counter entirely, and the contents of the up/down counter maintain a continuous running count of the "error", that is, the deviation between the number of driving pulses as compared to the number of tachometer pulses, throughout an entire cycle of scan and rescan movements, thereby eliminating any position error caused by resetting of the position counter at the termination of the rescan and prior to scan, and assuring that the position profile of the carriage will be repeatable from one rescan-scan cycle to the next. Likewise, since the driving signal source is timed only by the velocity of the image carrier, the velocity profile of the scanning carriage relative to the image carrier is also repeatable from one rescan-scan cycle to the next, to within a tolerance of less than a single tachometer pulse.

FIG. 11 is a block diagram of the second preferred embodiment of the invention, which illustrates the apparatus employed in the second embodiment in lieu of that shown in FIG. 7. Similar to FIG. 7, input signals are coupled to the control loop from the drum (or image carrier) tachometer 22 as well as the scanning carriage assembly tachometer 23, and the control loop generates a signal to control the servo motor 70a which drives the scanning carriage assembly. In contrast to FIG. 7, however, the microprocessor 100' is now no longer in the control loop. Rather, the control loop includes an up/down counter 406 which may be counted in one direction, for example, up, in response to a driving signal comprising a train of pulses, from a counter 403 coupled through the sign and count logic 405. Similarly, the up/down counter 406 can be counted down by the output of the scanning carriage assembly tachometer 23 which output is coupled through the same sign and count logic 405. Each pulse output of the counter 403 represents a desired increment of scanning carriage assembly travel, and likewise, the tachometer 23 produces a train of pulses, each pulse represents a similar increment of actual scanning carriage assembly travel. Accordingly, the up/down counter 406 may contain a real time count of the difference between the desired scanning carriage assembly travel and actual scanning carriage assembly travel, or a position error. In the control loop the output of the up/down counter 406 is coupled to drive the servo motor 70a through the digital to analog converter 407, and filter and compensation network 408 and power amplifier 410. A friction compensation signal can also be provided through the power amplifier 410 by a friction compensation network 409, which is enabled from the sign and count logic 405.

The control loop described above operates in a manner very similar to the operation of the first preferred embodiment during constant velocity motion with a very significant exception. The control loop, operative during constant velocity motion in the first preferred embodiment of the invention, employed a phase detector which is enabled to output an error signal representing the difference between the desired and actual scanning carriage velocity. The phase detector actually determined the difference in arrival time at the phase detector 105 of a pulse from the reference clock 104 and a pulse from the tachometer 23. Under circumstances wherein the actual and desired velocity of the carriage are substantially equal, this arrangement is effective in maintaining actual velocity at or near the desired velocity. However, since this circuitry is incapable of keepng track of more than one pulse position error it has been modified as shown in FIG. 11 to incorporate the up/down counter 406 which is capable of keeping track of position errors greater than a single driving or tachometer pulse. Those skilled in the art will understand that as the position error increases, the driving signal to the servo motor 70a likewise increases, and this can be employed to accelerate or conversely, decelerate the servo motor 70a in a manner now to be explained.

The driving signal for counting the up/down counter 406, in a particular direction, for example up, is derived from the output of a counter 403, which corresponds to the operation of the counter 133 (FIG. 10) of a first preferred embodiment during constant velocity motion. That is, more particularly, the counter is cycled by a pulse train derived from a clock 401 which is synchronized to the motion of the image carrier or drum. The counter 403 can be preset so that it counts from its preset position to a terminal count, produces an output pulse corresponding to one pulse in the driving pulse train, and is again preset to repeat the operation. It should be apparent that the quantity to which the counter 403 is preset (assuming that the clock signal 401 is relatively stable) determines the repetition rate of the counter output, which is the driving pulse train. In fact, by providing a sequence of quantities to which the counter is preset in a predetermined order, the repetition rate of the driving pulse train can be controlled. By varying the repetition rate of the output of the counter 403, the velocity profile to which the scanning carriage is controlled can be selected. Not only can constant velocity motion be controlled in this fashion, but acceleration and deceleration as well. Since the counter is cycled by the output of clock 401, which is synchronized to the motion of the image carrier, the entire control loop is maintained in step with the image carrier velocity which is, of course, a prime requirement for the motion of the scanning carriage assembly in the copier.

The quantities to which the counter 403 is preset are derived from the latches 404 which in turn derive these quantities from the microprocessor 100'. Since the latches 404 buffer the operation of microprocessor 100', any impediment to accurate control provided by the poor timing of the microprocessor 100' is eliminated.

From the preceding brief discussion, operation of the second preferred embodiment should be apparent. More particularly, after the operator has positioned the lens 9 to a desired position corresponding to a desired reduction ratio, and enabled copying to proceed by pressing the start button, for example, microprocessor 100' performs the functions of initializing the control loop by loading the latches 404 with an initial quantity or quantities and provides a start signal to the clock 401. At the proper time, as determined by the position of the drum, and in synchronism therewith, the clock 401 begins producing clock pulses to cycle the counter 403. As the counter 403 reaches a terminal count and produces an output pulse, it is again preset and continues counting. This output of the counter 403 places an initial count into the counter 406. Depending on the gain of the control loop, one or more counts may be placed in the counter 406 before the servo motor actually begins moving and as it begins moving, the up/down counter responds to the outputs of the tachometer 23. At regular intervals, timed from the clock 401 which is synchronized to the image carrier or drum, the microprocessor 100' is interrupted and new quantities are loaded into the latches 404 for use in presetting the counter 403, and in this fashion, the repetition rate of the output of the counter 403 can be varied so as to require the servo motor 70a and the scanning carriage assembly to follow a desired position and velocity profile. In this fashion, the scanning carriage assembly undergoes acceleration, constant velocity motion and deceleration. At the termination of the deceleration, the rescan movement is completed; in contrast to the first preferred embodiment, the up/down counter 406 is not reset, and accordingly, even if there is some position error at the termination of the rescan movement, it will be maintained as the direction of motion of the scanning carriage assembly is reversed to begin the scanning movement. The scanning movement also includes similar phases such as acceleration, constant velocity and deceleration motion. Since the up/down counter 406 is not reset, and since the only variable in the entire operation is the velocity of the image carrier, the scanning carriage assembly comes up to its desired constant velocity at a time, in relation to position of the image carrier which is accurate to less than a tachometer pulse, and in one embodiment of the invention which has been constructed, this was less than 0.25 mm.

FIG. 12A illustrates the clock 401, and FIG. 12B illustrates some of the waveforms produced thereby. The basic timing of this clock is produced by the VCO 412 which is driven by phase detector 411 from a pair of inputs, one of which is provided by the drum tach 22, and the other of which is a divided replica of the output of the VCO itself, thus forming a phase locked loop. Accordingly, the repetition rate of the output of VCO 412 follows the velocity of the drum, an in an embodiment of the invention which has been constructed, the VCO 412 output is in the vicinity of 2.3 MHz. The output of the VCO 412 is provided to a clock circuit 413 which provides a pair of pulse trains from the output of the VCO, as shown in FIG. 12B, a first pulse train CL1 and a second pulse train CL2, by directing successive VCO output pulses to different outputs. The pulse train CL2 is employed to up count a counter 414, whose terminal count output is provided as the other input to the phase detector 411. A decoder 415 monitors the condition of several stages of the counter 414 and upon recognizing a predetermined count, is latched to produce a distinctive output signal to an AND gate 416, whose other inputs comprise the microprocessor start signal and the unique emitter position corresponding to the drum position at which operation of the control system should be enabled. The output of the AND gate 416, the signal ENABLE, is employed in one instance to enable a counter 417, which counts in response to the condition of a selected stage of the counter 414. A selected stage of the counter 417, which may, for example, be the terminal count, provides an interrupt signal to the microprocessor. The number of stages in the counter 414 and 417 are selected so that, at the nominal drum velocity, the microprocessor is interrupted often enough to load the latches 404 as required for proper operation. In the embodiment of the invention which has been constructed, this interrupt rate was approximately once every 3.4 milliseconds.

It should be apparent from the foregoing that the operation of the control loop is initialized to begin operations at a predetermined position of the image carrier since the operations of the control loop itself do not begin until the ENABLE signal is produced, as will be specified hereinafter.

FIG. 13 illustrates the counter 403, the latches 404 which load it, and the load logic which controls the loading of the latches 404 and the counter 403, and the gate which enables the counter 403 to count. More particularly, the latches include latches 404a, 404b and 404c. Latches 404a, and 404b are coupled to the microprocessor data bus, and the outputs of latches 404a and 404b provide the input to latch 404c. A plurality of the stages of latch 404c provide a setting input to a counter 403 to change the modulus of that counter in accordance with the quantities stored in the plurality of stages of the latch 404c. AND gate 424 provides an output to the down counting input of the counter 403, the input to the gate 424 comprising the CL1 signal and the ENABLE signal. Accordingly, when the ENABLE signal is produced, the gate 424 provides the CL1 pulses to the counter 403 to enable it to count down.

Thus, the counter 403 counts down from a state, either reset state or the state to which it is set by latch 404c. The output pulse, for driving the servo motor, is produced by an underflow. The repetition rate of the underflow pulse is controlled by selecting the quantity to which the counter is set. Completely equivalent would be using an overflow to drive the servo motor, in which case counter 403 is counted up from an initial set state. Similar effects are achieved by using a comparator, one input of which is the latch 404c and another input of which is the condition of counter 403 and producing a driving pulse on an equal comparison and resetting the counter. In either of these three arrangements, the modulus of the counter and therefore the repetition rate is determined by the latch 404c.

The load logic 402 includes the decoders 420, 421 and OR gate 423. As shown in FIG. 13, the microprocessor address bus forms one input to decoder 420, another input of which comprises the microprocessor read/write line, and the third input is the signal CL1. On decoding a read at an appropriate address, the signal LOAD A is produced and coupled to latch 404a which then accepts the information existing simultaneously in the microprocessor data bus. Accordingly, at CL1 (when the microprocessor has addressed an appropriate memory area) latch 404a is loaded; in similar fashion, but based upon a different address, at a different CL1 time, the signal LOAD B is produced to enable latch 404b to be loaded by the data on the microprocessor data bus.

The load logic 402 also includes decoder 421, one of whose inputs is the microprocessor address bus, a second of whose inputs comprises a microprocessor read/write signal, and a third input comprises the clocking signal CL1. The foregoing inputs are employed during system initialization or start-up to provide the LOAD C signal through the OR gate 423 to load latch 404c from the contents of latches 404a and 404b. At other times, the LOAD C signal is produced in response to the INTERRUPT signal also coupled through the OR gate 423; the INTERRUPT signal is produced by the counter 417 (see FIG. 12A). Accordingly, at all times other than start-up, latch 404c is loaded and the rate at which it is loaded depends upon counter 417 which is, of course, synchronized to the image carrier velocity.

Finally, the load logic 402 includes AND gate 422 whose inputs comprise the clocking signal CL1 and the COUNT signal produced when the counter 403 produces a borrow. Accordingly, at that time, the counter 403 is loaded with the contents of a plurality of stages of the latch 404c.

Finally counter 403 also counts a count down signal produced by an AND gate 424, whose inputs are the signal ENABLE and the clocking signal CL1. The former signal is produced by the gate 416 (see FIG. 12A). Accordingly, it should be apparent that the counter is loaded on the first available CL1 signal after the latch 404c has been loaded by the latches 404a and b, and it begins counting down with the first CL1 signal existing after the signal ENABLE is produced.

Since the clocking signal CL1 is produced in synchronism with the velocity of the image carrier, the counter 403 is counted down at a corresponding rate. In the absence of a setting input to the counter 403 from the latch 404c, the counter 403 produces a COUNT signal at a rate determined by the capacity of the counter 403 and the rate at which the CL1 signal is produced. That rate, however, can be decreased by setting the counter 403 initially to the quantity from the latch 404c. In this fashion, the rate at which the COUNT signals are produced can be controlled.

FIG. 14 comprises a schematic of the sign and count logic 405 and the bias up or down logic 425. The sign and count logic 405 includes a pair of gates 430 and 431, the first providing a COUNT UP pulse train and the second providing a COUNT DOWN pulse train, derived from the COUNT signal and differentiated with respect to whether or not the up/down counter 406 is to count up or down with respect to the particular COUNT pulse. Inputs to the gates 430 and 431 comprise the signal COUNT from the counter 403 (FIG. 11) and the signal SIGN derived from one stage of the latch 404c and coupled directly to the gate 430 and coupled to gate 431 through an inverter 432. The third input to the gate 430 and 431 is the signal ENABLE. Accordingly, a pulse or train of pulses comprising the signal COUNT will produce a COUNT UP or COUNT DOWN pulse train when the ENABLE signal is present, depending upon the condition of the signal SIGN.

The sign and count logic 405 also includes a sign logic circuit 433 to which are applied the outputs from the scanning carriage assembly tachometer 23. The sign logic 433 is merely a phase comparator and provides an output labelled TACH SIGN, which comprises a signal in either one of two stages depending upon the direction of rotation of the motor 70a. One of the two outputs from the tachometer 23 is coupled to a gate 434 where it is gated with the clock signal CL2 and the gated output is coupled as an input to each of a pair of gates 435 and 436. Another input to each of these gates is the signal ENABLE. The TACH SIGN signal is coupled directly as an input to gate 435, and coupled through inverter 437 to gate 436. Accordingly, a train of tach pulses will produce an output train of pulses from either servo up or servo down gates 435, 436, respectively, each occurring at clock time CL2 and selected by the condition of the signal TACH SIGN. The output of gates 430, 431, 435 and 436 are coupled as inputs to gates 438 and 439, respectively, in a manner such that signals representing desired up counts are coupled to gate 438 and the signals representing desired down counts are coupled to gate 439. These gates are also responsive to signals BIAS DOWN and BIAS UP, and the production of these signals will now be explained.

The BIAS UP or DOWN logic 425 is also illustrated in FIG. 14, and includes a decoder 440, which is responsive to the signals in the microprocessor address bus and the R/W. Upon detection of a selected address, the decoder 440 provides an input to a gating circuit 441 where it is gated with the clocking signal CL1 and provides an input to a pair of NAND gates 442 and 443, respectively. The other input to these gates are provided by different signals from the multi-bit data bus, for example, as shown in FIG. 14, bit zero is coupled to gate 443 and bit one is coupled to gate 442. The output of the gates 442 and 443 are coupled respectively to gates 438 and 439 such that the desired up counting signals are coupled through gate 438 and the desired down counting signals are coupled through gate 439. Accordingly, OR gate 438 produces an output pulse for each count, servo tach pulse or bias pulse for which the up/down counter 406 is to count up and correspondingly, OR gate 439 produces a pulse corresponding to each count, tach pulse or bias pulse for which the up/down counter 406 is to count down.

From the preceding discussion of FIGS. 11 through 14, operation of the second preferred embodiments should now be apparent. In brief compass, and referring again to FIG. 11, the microprocessor responds to lens tach 21 pulses in order to keep track of the position of the lens 9 which is directly under operator control, and which is representative of the desired reduction ratio. When the operator presses the start button, the microprocessor can select, based upon the desired reduction ratio, a particular table stored in memory from which the various quantities for setting the counter 403 are derived so as to effectively control the modulus of the counter 403 and therefore the repetition rate of the signal COUNT. In an embodiment of the invention actually constructed, only a single table was stored, and other tables were created by arithmetically modifying each entry in the single stored table, based on the desired reduction ratio to, in effect, create a plurality of virtual tables. In some instances, in addition to this creation of plural virtual tables, for certain selected reduction ratios, the up/down counter 406 was also initially set or the initial position of the carriage selected by selectively pulsing counter 406. This is effected by the microprocessor by employing the bias up or down logic 405 to, in effect, step the counter 406 up or down by the selected amount, for the particular reduction ratio. In addition to such operation, if required, the latches 404 are also initially loaded; reference to FIG. 13 indicates that the initial loading requires 4 memory words, i.e., two memory words to load the latches 404a and b, and an additional pair of words to again load the latches 404a and b after their contents have been transferred to the latch 404c by appropriate microprocessor instructions.

Once the foregoing functions have been accomplished, the microprocessor is enabled to issue the microprocessor start signal (see FIG. 12A). At the same time, since the image carrier drum is rotating, the counter 414 is continuously cycling. When the counter reaches a count to which decoder 415 responds, it latches to partially enable the gate 416 and when the unique emitter position is reached, gate 416 is fully enabled, producing the ENABLE signal which enables the interrupt counter 417 to begin counting, and through gate 424, enables counter 403 to begin counting down for each CL1 pulse. The down counting is thus performed at a rate related to the velocity of the image carrier, and when underflow occurs, the output COUNT is produced with two effects. In the first place, it partially enables gate 422, which is fully enabled on the next CL1 pulse. At the same time, it partially enables either gate 430 or 431 (FIG. 14) depending on the condition of the SIGN signal which, in turn, produces an output from either OR gate 438 or 439 to either up or down count the counter 406.

The counter 403 is now loaded with the quantity retained in the latch 404c, and that quantity is again down counted until a new production of the COUNT signal. It should be apparent to those skilled in the art that the quantity to which the counter 403 is set determines the modulus of the counter or the period between subsequent COUNT signals. On each occurrence of the INTERRUPT signal (from counter 417—FIG. 12A), the latches 404c are loaded from latches 404a and b. The INTERRUPT signal may also be employed, at the microprocessor, so as to provide for loading of the latches 404a and 404b.

Since the counter 403 counts each quantity loaded therein down to the underflow condition, it is a simple matter to determine the number of COUNT pulses produced by any sequence of quantities loaded into the counter 403. For each such pulse, the up/down counter 406 will count in the direction determined by the SIGN signal and thus, the total displacement can readily be determined. The rate at which this movement is accomplished, and the acceleration with which it is accomplished is determined by the various quantities loaded into the counter 403, and the sequence in which those quantities exist in a microprocessor memory from which they are loaded.

The INTERRUPT signal is employed, at the processor, to select a quantity to output on the data bus for loading to the latch 404a or b, a single interrupt generating a pair of quantities in succession, one for latch 404a, the other for 404b. Since the quantities loaded into latches 404a and b are not immediately used, processor timing is no longer a factor in carriage assembly movement.

While a table may be stored for each possible reduction ratio which has a plurality of quantities stored, one for each quantity used in a rescan-scan cycle, memory area can be saved in a number of ways. Firstly, in a constant velocity phase of movement, the quantity which the counter decrements is identical. Thus, the quantity need only to be stored once and the processor merely counts the number of INTERRUPTs until a given number is reached, after which a different quantity is output on the data bus.

Further memory storage can be saved in that a table of quantities for one reduction mode may be similar but offset from another table by a constant. In such a case, a single table is stored and, to recreate the other table, a constant is added to each entry in the stored table as it is placed on the data bus.

While the invention has been described with reference to a scanning optical system, it is equally applicable to a moving document system where the servo motor would drive the document support across stationary optics. It is also applicable to scanning lens systems where the servo motor would drive the scanning carriage for the lens. Multiple focus systems could be used with the instant invention as well as single focus lens. Additionally, while the invention is obviously of greater value when used with continuously variable systems, it may be used with single speed scanning apparatus or apparatus with only a few scanning speeds.

Importantly, the invention can be applied outside the field of electrophotographic copiers to wherever scanning mechanisms are used and wherever servo systems are required to possess accurate acceleration and velocity profiles in order to obtain highly accurate position repeatability. Such modifications are uses are well within the skill of the art and fall within the scope of the invention.

What is claimed is:

1. A scanning electrostatic copying machine for copying at substantially any reduction ratio within a range of reduction ratios including:
   a motor (10),
   image carrier means (13) driven by said motor for recording a latent optical image thereon,
   a transparent document support (50),
   a lens (9),
   reduction means (18) for positioning said lens between said support and said image carrier means at a position corresponding to a selected reduction ratio within said range,
   scanning carriage means (12) including a scanning carriage for scanning said document support and for directing an image beam from said document support through said lens to said image carrier means, and
   servo motor means (70, 17, 70a) responsive to said reduction means and to motion of said image carrier means for driving said scanning carriage for movement in relation to motion of said image carrier means uniquely selected in accordance with said selected reduction ratio,
   said servo motor means including control means (15) for positioning said scanning carriage, preparatory to a document support scanning movement, from a reference position to a start of scan position selected in accordance with said reduction ratio.

2. The machine of claim 1 in which said servo motor means includes control means (15) for driving said scanning carriage at a unique velocity relative to motion of said image carrier means during document support scanning movement, said velocity selected in accordance with said reduction ratio.

3. The machine of claim 2 in which said control means (15) further includes a phase locked loop including
   first transducing means (22) providing an output representative of image carrier means velocity,
   second transducing means (23) providing an output representative of scanning velocity,
   means for differencing a constant times said first transducer output and said second transducer output (104, 105) and providing an output representative of said difference,
   and means for adjusting scanning carriage velocity (106, 107, 109) to reduce said output representative of said difference.

4. The machine of claim 3 in which said
   first and second transducing means provide first and second pulse outputs of frequency corresponding to image carrier means and scanning carriage velocity, respectively,
   dividing means (104) clocked by said first pulse output for dividing by a constant selected in dependence on said selected reduction ratio,
   and said means for differencing comprises a phase comparator (105) responsive to said dividing means and said second pulse output.

5. The machine of claim 1 in which said servomotor means includes
   a servomotor (70a),
   energization means (108, 111, 112, 109) to energize said servomotor with energization selected in dependence on image carrier position.

6. The machine of claim 5 in which said servomotor means further includes
   acceleration means (112, 111, 100) responsive to said energization means to accelerate said scanning carriage for a selected time to a unique velocity, said selected time and unique velocity selected in accordance with said selected reduction ratio.

7. The machine of claim 6 in which said acceleration means includes
   timing means (216, 217, 215) enabled on acceleration of said scanning carriage to produce a series of time spaced pulses,
   transducer means (23) responsive to scanning carriage movement to emit an output signal representative thereof,
   a counter (209, 210) coupled to said transducer means and responsive thereto,
   comparison means (111) coupled to said counter and enabled on each of said timing means pulses for comparing a condition of said counter with a desired condition of said counter and for producing an output representative of a difference therebetween, and
   means (100, 107, 109, 110) for applying a signal representative of said difference to said servomotor.

8. The machine of claim 7 which further includes
   means (111) for disabling said acceleration means in response to said timing means.

9. The machine of claim 1 which further includes
   velocity control means (104, 105) for maintaining scanning carriage velocity to a selected ratio of image carrier means velocity, selected in accordance with said reduction ratio, acceleration control means (111, 100) for accelerating said scanning carriage for a predetermined time, said predetermined time selected in accordance with said selected reduction ratio, means responsive (108, 111) to image carriage position for enabling said acceleration control means, and, timing means (215-217, 111) for disabling said acceleration control means and for enabling said velocity control means after a predetermined acceleration time, predetermined in accordance with said selected reduction ratio.

10. The apparatus of claim 1 further including deceleration means (111, 112) for decelerating said servomotormeans when enabled, means responsive to scanning carriage position (203, 204, 214) for disabling said deceleration means, and position error means (201, 202, 218, 219, 220, 221) enabled on disablement of said deceleration means for driving said servomotor means in accordance with scanning carriage position error.

11. The apparatus of claim 10 including a first counter (203, 204) means containing a count related to scanning carriage position error, a second counter means (209, 210) containing a count representing scanning carriage deceleration movement wherein said deceleration means includes comparison means (213) for comparing said first and second counter means and decelerating said servomotor means when said counts are in a predetermined relation.

12. The apparatus of claim 10 in which said means for disabling said deceleration means includes a comparator (214) comparing said first counter means to a reference quantity for disabling said deceleration means in response to a predetermined relationship of said first counter means and said reference quantity.

13. The apparatus of claim 10 in which said position error means includes first counter means (201, 202) containing a count related to scanning carriage position error, and a digital to analog converter means (221) for converting an output of said first counter means, when enabled, and for applying said converted output to said servomotor means.

14. A substantially continuously variable reduction ratio document copier machine with scanning carriage means driven in servo relationship to image carrier means including:

a motor, image carrier means driven by said motor for recording an image thereon, scanning carriage means for scanning a document to be copied, servo motor means for driving said scanning carriage means for scanning movement in synchronism with the motion of said image carrier means, said servo motor means including a control means for driving said scanning carriage means at a unique velocity relative to the motion of said image carrier means during a scanning movement, wherein said control means includes:

first transducing means providing a pulse output with frequency representative of image carrier means velocity, second transducing means providing a pulse output with frequency representative of scanning carriage means velocity, means for differencing a constant times said first transducing means output and said second transducing means output and providing an output representative of said difference, said means for differencing including:

dividing means clocked by said pulse output of said first transducing means for dividing by a constant selected in dependence on said selected reduction ratio, and a phase comparator responsive to said pulse output of said second transducing means and said dividing means, and means for adjusting scanning carriage means velocity to reduce said output representative of said difference.

15. The machine of claim 14 in which said servo motor means includes control means for positioning said scanning carriage, preparatory to a scanning movement, from a rest position to a start of scan position.

16. A document copier capable of substantially continuous variable reduction ratio with scanning carriage means driven in servo relationship to image carrier means including:

a motor, image carrier means driven by said motor for recording an image thereon, scanning carriage means for scanning a document to be copied, servo motor means for driving said scanning carriage means for scanning movement in synchronism with the motion of said image carrier means, said servo motor means including, a servo motor, and energization means to energize said servo motor with energization selected in dependence on image carrier position.

17. The machine of claim 16 in which said servomotor means further includes:

acceleration means responsive to said energization means to accelerate said scanning carriage for a selected time to a unique velocity, said selected time and unique velocity selected in accordance with said selected reduction ratio.

18. The machine of claim 17 in which said acceleration means includes:

timing means enabled on acceleration of said scanning carriage to produce a series of time spaced pulses, transducer means responsive to scanning carriage movement to emit an output signal representative thereof, a counter coupled to said transducer means and responsive thereto, comparison means coupled to said counter and enabled on each of said timing means pulses for comparing a condition of said counter with a desired condition of said counter and for producing an output representative of a difference therebetween, and means for applying a signal representative of said difference to said servomotor.

19. The machine of claim 18 which further includes:

means for disabling said acceleration means in response to said timing means.

20. A document copier capable of substantially continuously variable reduction ratio operation with scanning carriage means driven in servo relationship to image carrier means including:

a motor, image carrier means driven by said motor for recording an image thereon, scanning carriage means for scanning a document to be copied, servo motor means for driving said scanning carriage means for scanning movement in synchronism with the motion of said image carrier means, wherein said servo motor means includes:

velocity control means for maintaining velocity of a scanning carriage in said scanning carriage means relative to image carrier means velocity, a ratio of said velocities selected in accordance with said reduction ratio, acceleration control means for accelerating said scanning carriage for a predetermined time, said predetermined time selected in accordance with a selected reduction ratio, means responsive to image carrier position for enabling said acceleration control means, and timing means for disabling said acceleration control means and for enabling said velocity control means after a predetermined acceleration time, predetermined in accordance with said selected reduction ratio.

21. A document copier capable of substantially continuously variable reduction ratio with scanning carriage means driven in servo relationship to image carrier means including:

a motor, image carrier means driven by said motor for recording an image thereon, scanning carriage means for scanning a document to be copied, servo motor means for driving said scanning carriage means for scanning movement in synchronism with the motion of said image carrier means, wherein said servo motor means includes:

deceleration means for decelerating said servo motor means when enabled, means responsive to position of a scanning carriage in said scanning carriage means for disabling said deceleration means, and position error means enabled on disablement of said deceleration means for driving said servo motor means in accordance with scanning carriage position error.

22. The machine of claim 21 including:

a first counter means containing a count related to scanning carriage position error, a second counter means containing a count representing scanning carriage deceleration movement wherein said deceleration means includes comparison means for comparing said first and second counter means and decelerating said servomotor means when said counts are in a predetermined relation.

23. The machine of claim 22 in which said means for disabling said deceleration means includes a comparator comparing said first counter means to a reference quantity for disabling said deceleration means in response to a predetermined relationship of said first counter means and said reference quantity.

24. The machine of claim 23 in which said position error means includes:

first counter means containing a count related to scanning carriage position error, and a digital to analog converter means for converting an output of said first counter means, when enabled, and for applying said converted output of said servomotor means.

25. A document copier machine with scanning carriage means driven in servo relationship to image carrier means including:

a motor, image carrier means driven by said motor for recording an image thereon, scanning carriage means for scanning a document to be copied, servo motor means for driving said scanning carriage means for scanning a movement in synchronism with the motion of said image carrier means, said servo motor means including a first closed loop control means to accelerate said scanning carriage means from a rest condition towards a desired speed before reaching a start of image transfer position, and second closed loop control means for maintaining said scanning carriage means at a constant speed, relative to said image carrier means, throughout said scanning, said first closed loop control means for decelerating said scanning carriage means and third closed loop control means for moving said scanning carriage means to a reference position.

26. The machine of claim 25 which includes means to control said first and second closed loop means in dependence on a selected reduction ratio within a range of reduction ratios.

* * * * *

UNITED STATES PATENT AND TRADEMARK OFFICE
CERTIFICATE OF CORRECTION

PATENT NO. : 4,332,461

DATED : June 1, 1982

INVENTOR(S) : Norman Cail, Raymond A. Daniels, John B. Eggerling and Gerald B. Lammers It is certified that error appears in the above—identified patent and that said Letters Patent is hereby corrected as shown below:

Col. 8, line 48, change "deflected" to -deleted-.

Col. 18, line 21, change "negatived" to -negated-.

Col. 23, line 3, change "t" to -to-.

Col. 29, line 8, change "stages" to -states-.

Col. 31, line 34, change "are" (first occurrence) to -and-.

Claim 10, line 3, change "servomotormeans" to -servo motor means-.

Claim 24, line 7, change "of" to -to-.

Signed and Sealed this

Seventeenth Day of August 1982

[SEAL]

Attest:

Attesting Officer

GERALD J. MOSSINGHOFF

Commissioner of Patents and Trademarks